US009265088B2

(12) United States Patent
Abhishek et al.

(10) Patent No.: US 9,265,088 B2
(45) Date of Patent: Feb. 16, 2016

(54) NATIVE WI-FI ARCHITECTURE FOR 802.11 NETWORKS

(71) Applicant: Microsoft Corporation, Redmond, WA (US)

(72) Inventors: Abhishek Abhishek, Woodinville, WA (US); Arun Ayyagari, Seattle, WA (US); Hui Shen, Issaquah, WA (US); Krishna Ganugapati, Redmond, WA (US); Jiandong Ruan, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 13/688,038

(22) Filed: Nov. 28, 2012

(65) Prior Publication Data

US 2013/0083698 A1    Apr. 4, 2013

Related U.S. Application Data

(62) Division of application No. 11/656,772, filed on Jan. 23, 2007, now Pat. No. 8,327,135, which is a division of application No. 10/306,169, filed on Nov. 27, 2002, now Pat. No. 7,698,550.

(51) Int. Cl.
*H04L 12/28* (2006.01)
*H04W 84/12* (2009.01)
(Continued)

(52) U.S. Cl.
CPC .............. *H04W 84/12* (2013.01); *H04L 63/08* (2013.01); *H04L 63/162* (2013.01); *H04W 12/06* (2013.01); *H04W 28/06* (2013.01); *H04W 88/08* (2013.01)

(58) Field of Classification Search
None
See application file for complete search history.

(56) References Cited

U.S. PATENT DOCUMENTS

| 2,879,382 A | 3/1959 | Freen |
| 3,803,664 A | 4/1974 | Triplett |

(Continued)

FOREIGN PATENT DOCUMENTS

| CA | 2213984 | 2/1998 |
| CN | 1525705 | 9/2004 |

(Continued)

OTHER PUBLICATIONS

JP Notice of Rejection for Application No. 2003-398057, Jul. 3, 2009.

(Continued)

*Primary Examiner* — Kibrom T Hailu
(74) *Attorney, Agent, or Firm* — Judy Yee; L. Alan Collins; Micky Minhas

(57) ABSTRACT

A software based wireless infrastructure system is provided. The system has a driver that communicates with the network stack and a network interface card (NIC), a station server in communication with the station driver and an 802.1X supplicant or an 802.1X authenticator. Each NIC provides station and/or access point functionality support. The driver drops packets that have been received if the packet has not been authenticated and associated. Packets that have been fragmented or encrypted are unfragmented and decrypted. An association manager is used in conjunction with a configuration table manager to associate stations and access points via management packets. A manager receives 802.1X data packets from the packet processor and sends them up to a station server that communicates with user mode applications and an 802.1X supplicant or an 802.1X authenticator that are used to authenticate and deauthenticate stations and access points. APIs are provided to enable communication between the components.

20 Claims, 9 Drawing Sheets

(51) Int. Cl.
*H04L 29/06* (2006.01)
*H04W 12/06* (2009.01)
*H04W 28/06* (2009.01)
*H04W 88/08* (2009.01)

(56) References Cited

U.S. PATENT DOCUMENTS

| | | | |
|---|---|---|---|
| 3,887,956 A | 6/1975 | Wind | |
| 5,062,069 A | 10/1991 | Takasu | |
| 5,361,402 A | 11/1994 | Grube | |
| 5,446,736 A | 8/1995 | Gleeson | |
| 5,627,829 A | 5/1997 | Gleeson | |
| 5,832,222 A | 11/1998 | Dziadosz | |
| 5,862,481 A | 1/1999 | Kulkarni | |
| 5,912,888 A | 6/1999 | Walsh et al. | |
| 5,949,776 A | 9/1999 | Mahany | |
| 6,137,802 A | 10/2000 | Jones | |
| 6,295,645 B1 | 9/2001 | Brewer | |
| 6,396,841 B1 | 5/2002 | Co et al. | |
| 6,439,464 B1 | 8/2002 | Fruhauf | |
| 6,526,506 B1* | 2/2003 | Lewis | 713/153 |
| 6,567,860 B1 | 5/2003 | Maxwell et al. | |
| 6,618,393 B1 | 9/2003 | Chiles | |
| 6,668,160 B2 | 12/2003 | Schmitt | |
| 6,693,888 B2 | 2/2004 | Cafarelli et al. | |
| 6,700,901 B1 | 3/2004 | Shaffer | |
| 6,711,160 B2 | 3/2004 | Chan | |
| 6,714,561 B1 | 3/2004 | Park | |
| 6,760,748 B1 | 7/2004 | Hakim | |
| 6,768,721 B1 | 7/2004 | Schmitz | |
| 6,795,407 B2 | 9/2004 | Chesson | |
| 6,823,526 B2 | 11/2004 | Howard | |
| 6,856,200 B1 | 2/2005 | Wei | |
| 6,879,600 B1* | 4/2005 | Jones et al. | 370/466 |
| 6,941,405 B2 | 9/2005 | Morrow | |
| 6,957,086 B2 | 10/2005 | Bahl | |
| 6,983,135 B1 | 1/2006 | Tsai | |
| 7,006,824 B1 | 2/2006 | Tse | |
| 7,016,948 B1 | 3/2006 | Yildiz | |
| 7,035,594 B2 | 4/2006 | Wallace | |
| 7,039,068 B1* | 5/2006 | Halasz | 370/473 |
| 7,054,296 B1* | 5/2006 | Sorrells et al. | 370/338 |
| 7,103,817 B1 | 9/2006 | Choksi | |
| 7,110,757 B2 | 9/2006 | Herrmann | |
| 7,116,679 B1 | 10/2006 | Ghahremani | |
| 7,120,129 B2 | 10/2006 | Ayyagari | |
| 7,146,142 B1 | 12/2006 | Raaf | |
| 7,194,263 B2 | 3/2007 | Bahl | |
| 7,224,679 B2* | 5/2007 | Solomon et al. | 370/338 |
| 7,313,098 B2 | 12/2007 | Bearden | |
| 7,346,477 B2 | 3/2008 | Desai | |
| 7,356,001 B1* | 4/2008 | Jones et al. | 370/331 |
| 7,366,508 B2 | 4/2008 | Hasegawa | |
| 7,426,550 B2 | 9/2008 | Abhishek | |
| 7,440,572 B2 | 10/2008 | Dellmo | |
| 7,440,754 B2 | 10/2008 | Bahl | |
| 7,599,304 B2 | 10/2009 | Desai | |
| 7,684,342 B2 | 3/2010 | Gupta | |
| 7,698,550 B2 | 4/2010 | Abhishek | |
| 7,702,775 B2* | 4/2010 | Kuan et al. | 709/224 |
| 7,792,923 B2 | 9/2010 | Kim | |
| 8,041,815 B2 | 10/2011 | Bahl | |
| 2001/0033556 A1 | 10/2001 | Krishnamurthy et al. | |
| 2001/0041538 A1 | 11/2001 | Schmitt | |
| 2001/0048744 A1* | 12/2001 | Kimura | 380/247 |
| 2002/0010584 A1 | 1/2002 | Schultz | |
| 2002/0022483 A1 | 2/2002 | Thompson et al. | |
| 2002/0052181 A1 | 5/2002 | Tsai | |
| 2002/0061748 A1 | 5/2002 | Nakakita et al. | |
| 2002/0072391 A1* | 6/2002 | Itoh et al. | 455/557 |
| 2002/0078365 A1 | 6/2002 | Burnett | |
| 2002/0112039 A1 | 8/2002 | Ullman | |
| 2002/0130142 A1 | 9/2002 | Wheeler | |
| 2002/0147820 A1 | 10/2002 | Yokote | |
| 2002/0156922 A1 | 10/2002 | Chan et al. | |
| 2002/0157007 A1 | 10/2002 | Sashihara | |
| 2002/0159407 A1 | 10/2002 | Carrafiello et al. | |
| 2002/0174254 A1 | 11/2002 | Kita | |
| 2002/0174335 A1 | 11/2002 | Zhang et al. | |
| 2003/0002524 A1 | 1/2003 | Feldman | |
| 2003/0005279 A1 | 1/2003 | Valenci | |
| 2003/0037237 A1 | 2/2003 | Abgrall | |
| 2003/0114153 A1 | 6/2003 | Shaver | |
| 2003/0158906 A1 | 8/2003 | Hayes | |
| 2003/0162556 A1 | 8/2003 | Libes | |
| 2003/0165130 A1 | 9/2003 | Wodzianek | |
| 2003/0204748 A1* | 10/2003 | Chiu | 713/201 |
| 2003/0208675 A1* | 11/2003 | Burokas et al. | 713/1 |
| 2003/0210700 A1 | 11/2003 | Chen | |
| 2004/0019786 A1 | 1/2004 | Zorn et al. | |
| 2004/0078597 A1 | 4/2004 | Sun | |
| 2004/0103278 A1 | 5/2004 | Abhishek | |
| 2004/0139201 A1 | 7/2004 | Chaudhary | |
| 2004/0160912 A1 | 8/2004 | Kubler | |
| 2004/0185845 A1 | 9/2004 | Abhishek | |
| 2004/0204079 A1* | 10/2004 | Hamdi | 455/557 |
| 2004/0223469 A1 | 11/2004 | Bahl | |
| 2004/0240412 A1 | 12/2004 | Winget | |
| 2004/0252649 A1 | 12/2004 | Wu | |
| 2005/0010755 A1 | 1/2005 | Sheth | |
| 2005/0048320 A1 | 3/2005 | Kobayashi | |
| 2005/0063355 A1 | 3/2005 | Iwamura | |
| 2005/0071476 A1 | 3/2005 | Tejaswini | |
| 2005/0101293 A1 | 5/2005 | Mentze | |
| 2005/0102529 A1 | 5/2005 | Buddhikot | |
| 2005/0152305 A1 | 7/2005 | Ji | |
| 2005/0197156 A1 | 9/2005 | Fourquin | |
| 2005/0201340 A1 | 9/2005 | Wang | |
| 2006/0045083 A1 | 3/2006 | Hasty | |
| 2006/0092864 A1 | 5/2006 | Gupta | |
| 2007/0201386 A1 | 8/2007 | Desai | |
| 2007/0201414 A1 | 8/2007 | Desai | |
| 2008/0037490 A1 | 2/2008 | Hughes | |

FOREIGN PATENT DOCUMENTS

| | | |
|---|---|---|
| DE | 4420448 C1 | 9/1995 |
| EP | 0359327 A2 | 3/1990 |
| EP | 0994607 A1 | 4/2000 |
| EP | 1081895 | 3/2001 |
| EP | 1111874 | 6/2001 |
| EP | 1134935 A2 | 9/2001 |
| EP | 1178644 A2 | 2/2002 |
| EP | 1227692 A1 | 7/2002 |
| EP | 1241838 | 9/2002 |
| EP | 1401180 A1 | 3/2004 |
| JP | 08-265322 | 10/1996 |
| JP | 2002-314549 | 10/2002 |
| JP | 2005-229605 | 8/2005 |
| KR | 2003-0053280 | 6/2003 |
| WO | WO 01/10073 | 2/2001 |
| WO | WO 01/78351 | 10/2001 |
| WO | WO 02/041487 | 5/2002 |
| WO | WO 02/41587 A2 | 5/2002 |
| WO | WO 02/47321 | 6/2002 |
| WO | WO 02/089339 A2 | 11/2002 |

OTHER PUBLICATIONS

CN Notice on Office Action for Application No. 200310119948.0, Oct. 19, 2007.

AU Examiner's First Report for Application No. 2003262219, Reference No. 12368030/DBW, Sep. 8, 2008.

EP Communication for Application No. 05 100 875.3-2211, Reference No. EP33863RK900peu, Dec. 21, 2010.

Aboba, "IEEE 802.1X Pre-Authentication", May 2002, IEEE, XP002544377, Retrieved from the Internet: URL:http://www.ieee802.org/1/files/public/docs2002/aboba-pre-authentication.

Aboba, "Extensible Authentication Protocol" (EAP), RFC 3748, Jun. 2004.

Blunk, "PPP Extensible Authentication Protocol" (EAP), RFC 2248, Mar. 1998.

(56) References Cited

OTHER PUBLICATIONS

"Network Driver Interface Specification—NDIS 5.0 Overview," Microsoft Windows White Paper, Copyright Microsoft Corporation 2004, updated Dec. 4, 2001.
Mackie, Kurt, "Cisco's CCX: Industry Broadside or Much Ado About Nothing?," Broadband Wireless Online, Mar. 3, 2003.
Azimuth Systems, Inc., "Azimuth W-Series WLAN Test Platform," httn://www.azimuth.netJindex.aso?o=79, printed on Feb. 27, 2006, pp. 1-2.
P. Callahan, "Swarm logic for wireless net management," EE Times, Dec. 31, 2003.
IEEE Std 802.1X-2001, "Port-Based Network Access Control", IEEE Computer Society, Jul. 13, 2001.
Canadian Intellectual Property Office, for Application No. 2,744,972, date Sep. 28, 2011.
EP Search Report, Ref EP29005RK900kj, for Application No. 03027398.1-1244/1424829, date Jul. 4, 2011.
Kuorilehto M., "Implementation of Wireless LAN Access Point with Quality of Service Support", IECON-2002, Proc 28th Annual Conf IEEE Indust Electr Sociey, Nov. 5-8, 2002.
Draft Supplement to Standard for Telecommunications and Information Exchange Between Systems—LAN/MAN Specific Requirements—Part 11: Wireless Medium Access Control (MAC) and physical layer (PHY) specification: Specification for Enhanced Security, IEEE-SA, Piscataway, NJ USA, pp. 1-210,Nov. 25, 2002.
Part 11: Wireless LAN Medium Access Control (MAC) and Physical Layer (PHY) specifications: Higher-Speed Physical Layer Extension i the 2.4 GHz Band, IEEE Std. 802.11b-1999, Approved Sep. 16, 1999, 89 pages.
Part 11: Wireless LAN Medium Access Control (MAC) and Physical Layer (PHY) specifications: High-speed Physical layer in the 5 GHZ Band, IEEE Std. 802.11a-1999, approved Sep. 16, 1999, 83 pages.
Wei, "A Timer-based Data Link Control Protocol for Mobile Computing", Proceedings of the IEEE International Conference on Universal Personal Communications, Oct. 5-9, 1998.
Bahl, "Enhancing the Windows Network Device Interface Specification for Wireless Networking", Microsoft Research, Jun. 1999.
EP Communication for Application No. 03 027 398.1-1244, Reference EP29005RK900kj, Dec. 4, 2012.
IN Examination Report for Application No. 1372/del/2003, Feb. 8, 2013.
IN Hearing Notice for Application No. 1372/DEL/2003, Apr. 3, 2014.
IN Decision for Application No. 137/DEL/2003 May 10, 2014.
NO Search Report for Application No. 20035245, Mar. 25, 2014.
NO Office Action for Application No. 20035245, Apr. 4, 2014.
U.S. Appl. No. 10/306,169, filed Nov. 27, 2012, Abhishek Abhishek.
U.S. Appl. No. 11/656,772, filed Jan. 23, 2007, Abhishek Abhishek.
U.S. Appl. No. 10/930,684, filed Aug. 31, 2004, Abhishek Abhishek.
U.S. Appl. No. 11/364,450, filed Feb. 28, 2006, Mitesh K. Desai.
U.S. Appl. No. 11/364,605, filed Feb. 28, 2006, Mitesh K. Desai.
U.S. Appl. No. 11/364,606, filed Feb. 28, 2006, Mitesh K. Desai.

* cited by examiner

NATIVE WI-FI ARCHITECTURE FOR 802.11 NETWORKS

FIELD OF THE INVENTION

This invention relates generally to wireless computing configuration and connectivity and, more particularly, relates to system configuration and connectivity provided for wireless computing for IEEE 802.11 networks.

BACKGROUND OF THE INVENTION

Most businesses have recognized the substantial benefits gained by operating in a networked computing environment. By establishing local area networks (LAN), businesses allow their employees to share network resources, such as printers, file servers, modem banks, e-mail servers, etc., while maintaining the distributed computing power of having a plurality of individual work station computers. Indeed, the benefits of networked computing are now available for home computing environments as more and more households begin having more than one computer. Now, as with at the office, network resources (e.g., a printer) may be shared among the members of the household.

Unfortunately, despite all the benefits that the networks provide, their hardwired architecture presents several problems that tend to limit the users ability to compute in a flexible manner. For example, many networked computer users are now provided the flexibility to take their computers with them wherever they go by utilizing laptop and notebook sized computers. Unfortunately, however, the physical wired architecture often does not accommodate multiple users in a particular location (e.g., in a meeting room) due to the limit of network connection port outlets that are physically installed at that particular location. Therefore, while a user has the theoretical ability to connect to the network from any location wherein a network port outlet is provided, the physical realities of the wiring installation often limit this. Additionally, even if a sufficient number of outlet ports were provided, the requirement for each user to carry around network cabling of lengths sufficient to couple to a network outlet is undesirable from a user standpoint. Likewise, the cost and difficulty of installing network cabling within a household to provide connectivity for each room of the house often limits the actual cable installed to only those fixed locations where computers and network resources are currently located. Therefore, such hardwired systems essentially preclude the mobile computing that has been enabled by the portable computing devices currently on the market.

In recognition of the significant limitations that a wired LAN architecture places on the mobility and flexibility of modern computing, many industry leaders have developed and are now implementing wireless networks. These wireless networks allow for substantially increased flexibility by enabling truly nomadic computing from any location within the business enterprise covered by the wireless LAN. No longer do users need to carry network connection cables and restrict themselves to computing only in physical locations where network connection outlets are provided. This wireless networking technology also has significant advantages for the home computer user who may now have full home network accessibility from any location within the house that is convenient.

Recognizing the tremendous benefits provided by wireless networking, their deployment in airports, hotels, schools, etc., is becoming much more widespread. Further, with the increasing popularity of handheld computing devices, the deployment of such wireless networks in shopping malls, grocery stores, and the like is envisioned. Further, wireless wide area network computing having coverage areas similar to that currently in widespread use for wireless telephone systems enable true nomadic computing regardless of a user's physical location. In this way, nomadic computer users are able to access their network resources and remain productive while waiting on a plane, commuting on a train, etc.

Recognizing that compatibility among the various network service providers who may deploy these wireless networks is of paramount importance to ensure the continued growth and acceptance of such technology, various industry standards have been developed. One such standard developed by the Institute of Electrical and Electronics Engineers (IEEE) is designated by IEEE 802.11. Under this wireless standard, nomadic computer users may form their own network in an ad hoc mode, or may connect to an established network in an infrastructure mode. In the ad hoc mode, there is no structure to the network, and each member is typically able to communicate with every other member. These ad hoc networks may be formed whenever a group of users wish to communicate among themselves to share information such as during a meeting. An example of such an ad hoc formed network under IEEE 802.11 is illustrated in FIG. 8. As may be seen from this simplified Figure, multiple users 802, 804, 806 communicate with one another in their own loosely formed network 800, all without the requirement of being coupled together by hard wires.

The second type of network structure of IEEE 802.11 is known as an infrastructure network and is illustrated in simplified form in FIG. 9. As may be seen, this architecture utilizes at least one fixed network access point (AP) 900 through which a mobile computer user 902, 904, 906 can communicate with the network members 908, 910 and resources 912, 914. These network access points 900 may be connected to hardwired LAN lines to broaden the wireless network's capability by bridging these wireless nodes to other wired nodes on the established network 916 and the architecture is limited to a single layer deep access point.

With the development and deployment of wireless networking devices and infrastructures, consumers and businesses are increasingly being able to realize the benefits of true mobile computing, collaboration, and information exchange. No longer are business travelers required to carry an assortment of cables and search endlessly for an available data port simply to connect to a network to retrieve email messages, download files, or exchange information. No longer are companies and home consumers restrained in where they may access their networks by the location of the Ethernet jacks on the wall. Meeting participants and groups of friends may now form their own ad hoc networks without connecting cables between themselves or logging in to some preexisting network.

Unfortunately, despite the significant advantages and flexibility that wireless networking brings to the computing environment, the hardware to implement these networks is quite complex and expensive. For example, the wireless network interface card (NIC) that provides the means for computers to communicate wirelessly must support most, if not all, of the functions specified in the 802.11 specification. Once a user has installed a wireless NIC, the wireless NIC must be either reconfigured or replaced when a wireless standard changes. The current user experience in configuring and updating the wireless NIC is still quite complex.

Further detracting from the user experience is the limitation of current wireless networks and mobile computing devices in providing the capability to form a wireless network using multiple layer deep access points. FIG. 10 illustrates the limitation of available systems. A conventional access point 1000 connected to a wired network 1002 has the limited capability to communicate with device 1014 that is connected to access point 1006. Devices 1006-1012 in communication with the wire access points 1004, 1014 can route packets to wired access point 1000 and get connectivity to the wired network 1002.

BRIEF SUMMARY OF THE INVENTION

A software based wireless infrastructure system is provided. The system has a station driver that communicates with the network stack and a network interface card (NIC), a station server in communication with the station driver and an 802.1X supplicant, an access point driver that communicates with a NIC and either a network bridge or a network stack that is in communication with a wired network, and an access point server in communication with the access point driver and an 802.1X authenticator. Each NIC provides station and/or access point functionality support.

The station driver and the access point driver each have a filtering engine that drops packets that have been received if the packet has not been authenticated and associated. A packet processor receives packets that have been authenticated and associated from the filtering engine and reassembles packets that have been fragmented. An association manager is used in conjunction with a configuration table manager to associate stations and access points via management packets. A second filtering engine acts like a switch and receives data packets from the packet processor and drops data packets sent by an unauthenticated sending device and sends data packets sent by an authenticated sending device up to the first network stack. A manager receives 802.1X data packets from the packet processor and sends them up to a station server that communicates with user mode applications and either an 802.1X supplicant or and 802.1X authenticator that are used to authenticate and deauthenticate other stations and access points.

APIs are also provided that provide methods to communicate between the user mode applications and the layers of the network stack such as stations and access points and the network interface card.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
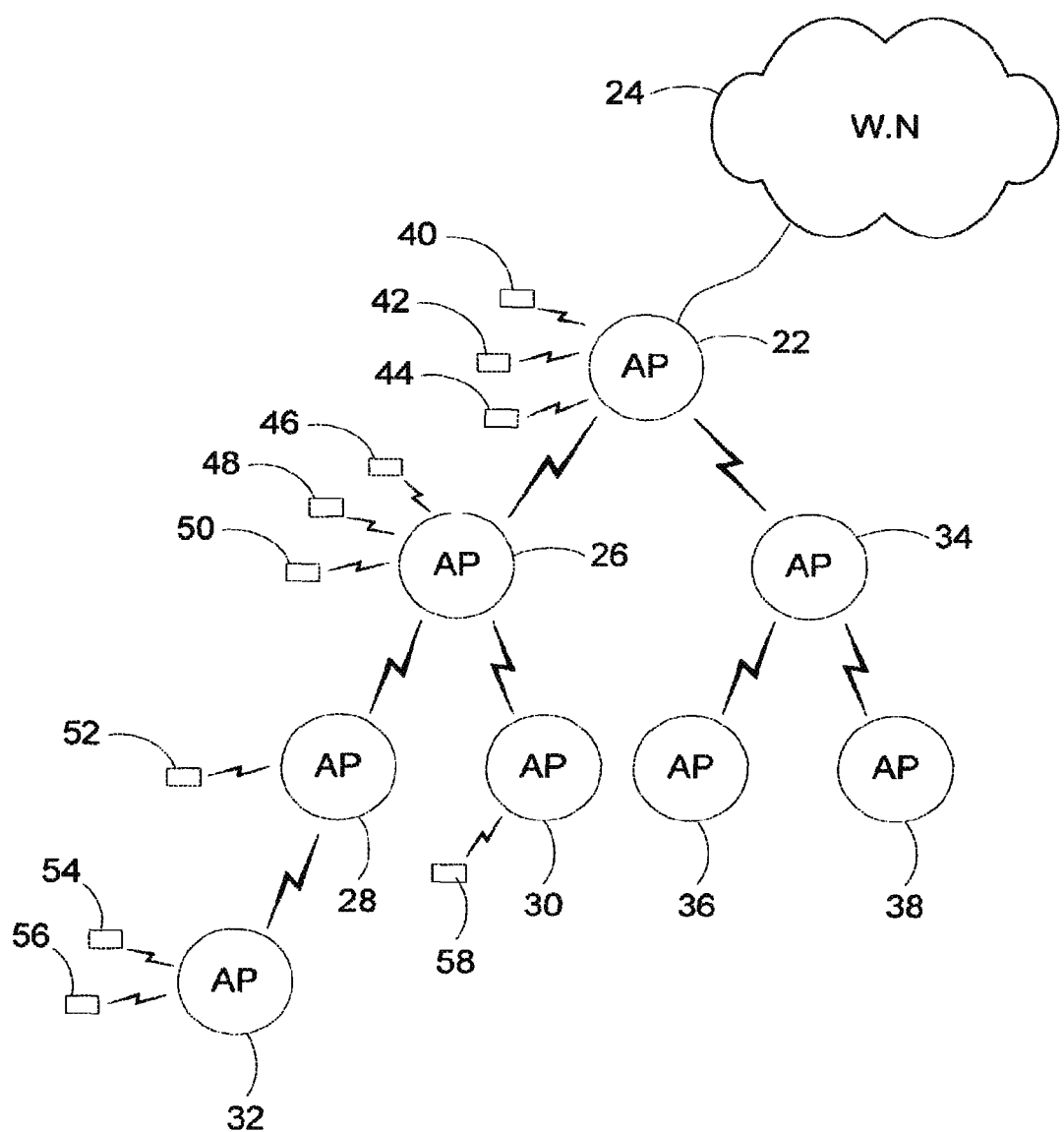
FIG. 1 is a block diagram generally illustrating an exemplary environment in which the present invention operates.

Turning to the drawings, wherein like reference numerals refer to like elements, the invention is illustrated as being implemented in a suitable environment. Although not required, the invention will be described in the general context of computer-executable instructions, such as program modules, being executed by a computing device. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable operating environment 20 in which the invention may be operated. A single access point 22 has wired connectivity (i.e., is hardwired) to a wired network 24 such as a LAN. The other access points 26-38 are be placed anywhere and these access points are in wireless communication to the wired access point 22 and to each other. The present invention provides the capability to Stations 40-44 are in wireless communication with wired access point 22 and can route packets to wired access point and get connectivity to Internet. Stations 46-50 are in wireless communication with wireless access point 26 and can route packets to wired access point 22 and get connectivity to the wired network 24. Additionally, the present invention provides the capability for stations 46-50 to route packets to stations 52-56 wirelessly via the wireless access points 28, 32. Station 52 is in wireless communication with wireless access point 28 and stations 54-56 are in wireless communication with wireless access point 32. Station 58 is in wireless communication with wireless access point 30. Stations 52-58 route packets to other stations in the network without having to route the packet to wired access point 22. For example, stations 58 can send packets to device 56 via access points 30-26-28-32.

Figure 2:
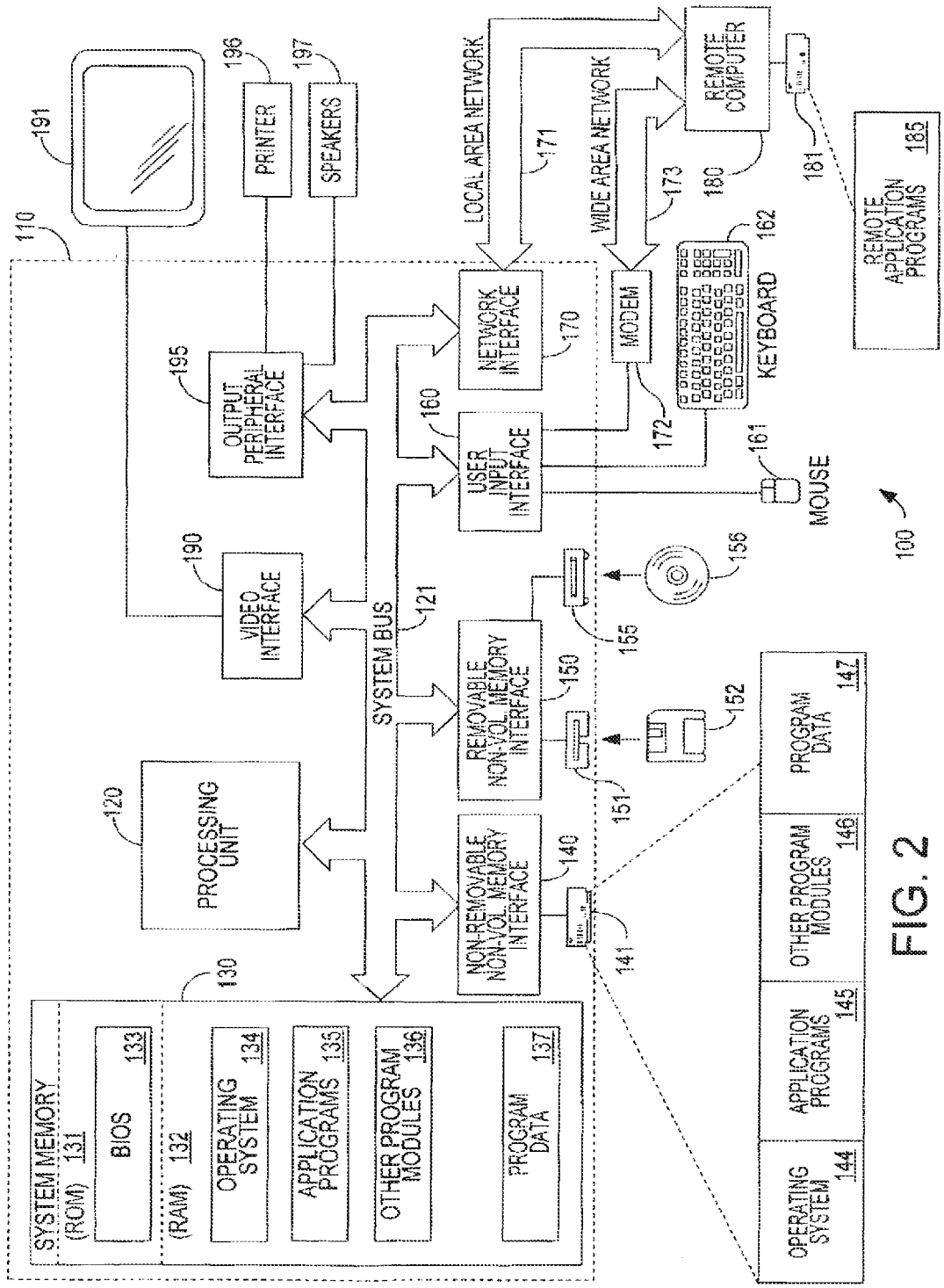
FIG. 2 is a block diagram generally illustrating an exemplary computer system on which the present invention resides.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2 for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware. The invention will describe a software based access point (AP or access point) in an infrastructure mode wireless LAN and a software based station (station) in either an infrastructure mode wireless LAN or an ad-hoc mode wireless LAN. The invention will describe the AP and station separately for clarity. The implementation may be integrated into a single infrastructure that allows for dynamic AP or station configuration via an user interface.

Figure 3:
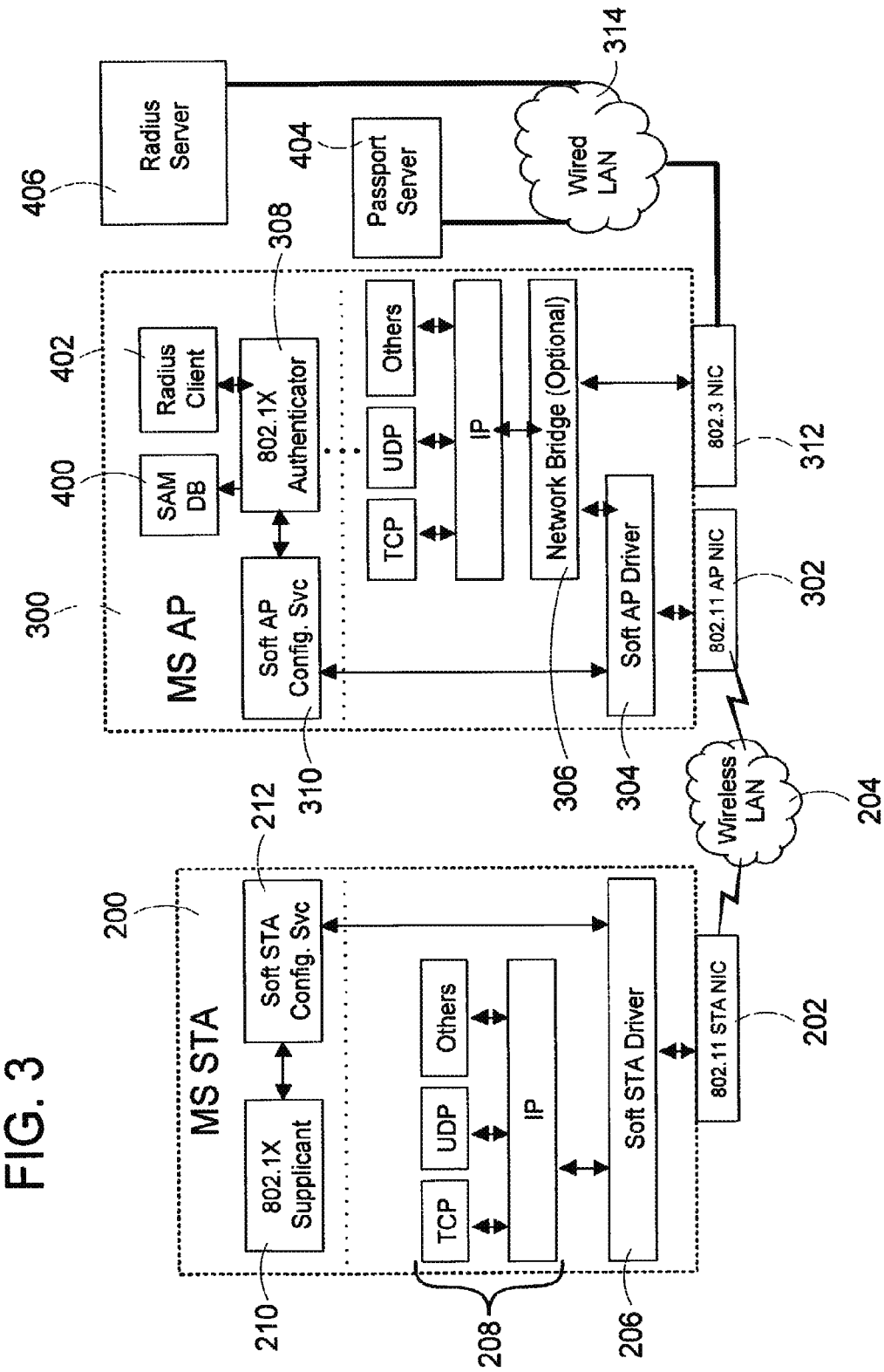
FIG. 3 is a block diagram generally illustrating the architecture of the station and access point of the present invention in the computer system of FIG. 2.

Turning now to FIG. 3, there are two categories of 802.11 service. These categories are the station service and the distribution system service. The 802.11 services are authentication, association, deauthentication, disassociation, distribution, integration, privacy, reassociation, and MSDU (MAC [media access control] service data unit) delivery. The station services are authentication, deauthentication, privacy, and MSDU delivery. The distribution system services include association, deassociation, distribution, integration and reassociation. Stations 200 communicate to access points 300 wirelessly.

Figure 4:
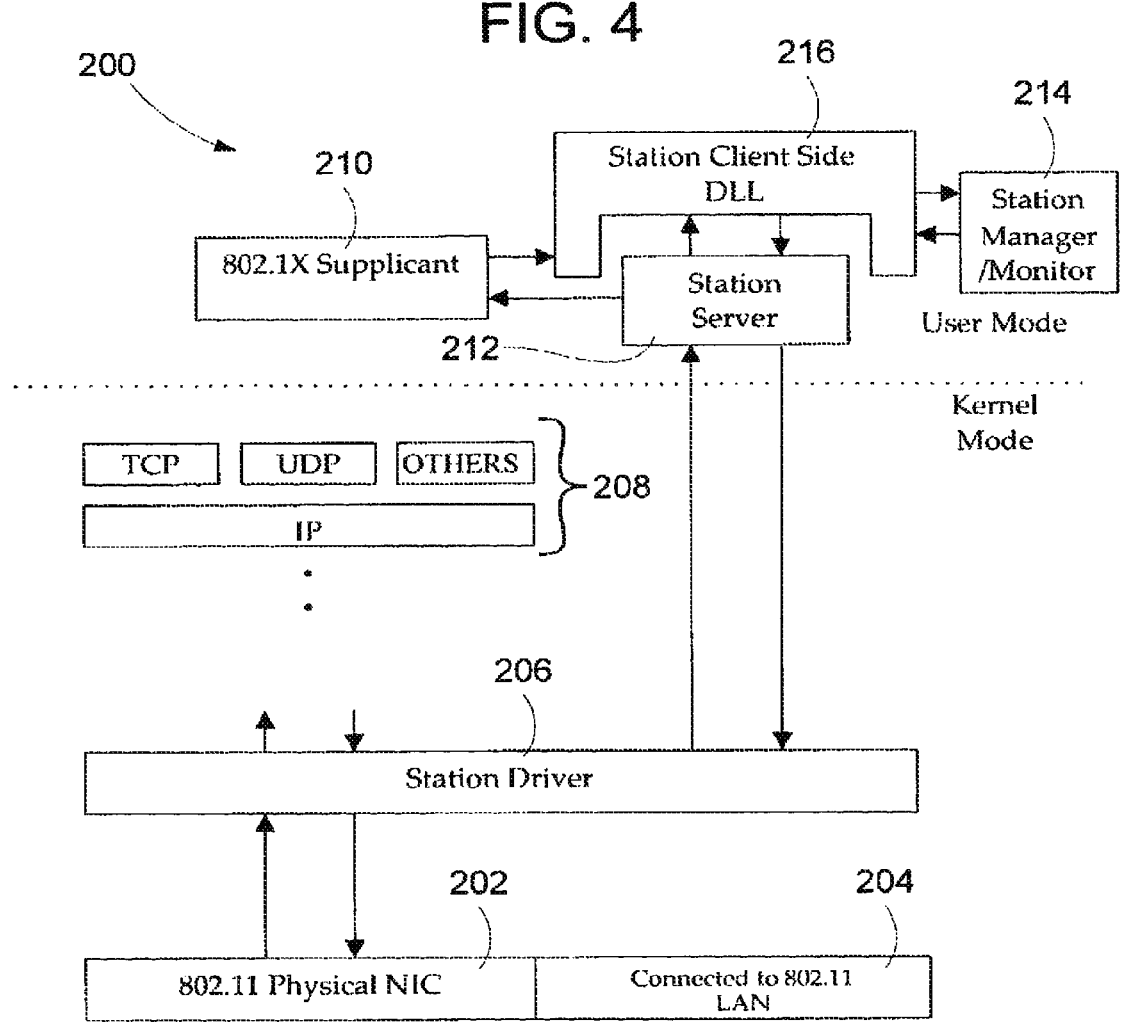
FIG. 4 is a block diagram of the station of the present invention.

In the description that follows, the architecture will be described with the station driver and access point driver as separate drivers. While described as separate drivers, it is recognized that the drivers may be combined into a single driver. FIG. 4 illustrates the overall architecture of a station in accordance with the present invention. The 802.11 network interface card (NIC) 202 is connected to a wireless LAN 204. When an 802.11 packet is received, it passes some 802.11 packets to its protocol, which is station driver 206. When an 802.11 packet is sent, the NIC 202 receives 802.11 packets from station driver 206 and sends them to destinations via wireless LAN 204. The NIC 202 may also perform 802.11 specific hardware operations as described below if the NIC 202 has a processing unit, in which it may subsume some 802.11 packets instead of indicating them up and also generate 802.11 packets on its own.

Station driver 206 is an 802.3 virtual miniport. It receives 802.11 packets from NIC 202 and converts some 802.11 packets to 802.3 packets before indicating them up to 802.3 protocols 208 such as TCP/IP. The driver 206 also indicates 802.1X packets to 802.1X supplicant 210 via upcalls to station server 212. On the send path, the driver 206 receives 802.3 packets from 802.3 protocols 208 and converts them as 802.11 packets before passing them to NIC 202. The driver 206 also sends out 802.1X packets received from 802.1X supplicant 210 via station server 212. In addition to 802.3/802.11 packet conversion, the driver 206 performs other 802.11 station operations in software, in which it may subsume some 802.11 packets instead of indicating them up and also generate 802.11 packets on its own.

802.1X supplicant 210 sends and receives 802.1X packets destined to and from an 802.1X authenticator via station server 212. Station server 212 acts a conduit between all interested user mode applications (like 802.1X supplicant 210, station manager/monitor 214, etc.) and station driver 206. The server 212 exposes APIs into which interested user mode applications can call into to make a down call to station driver 206. Station server 212 also receives a function table from each interested user mode application when the application registers itself with the server 212. The server 212 uses this function table to pass the upcall from station driver 206 to the destined user mode application. Station Client Side DLL 216 provides the capability to remote the APIs exposed by the server.

Figure 5:
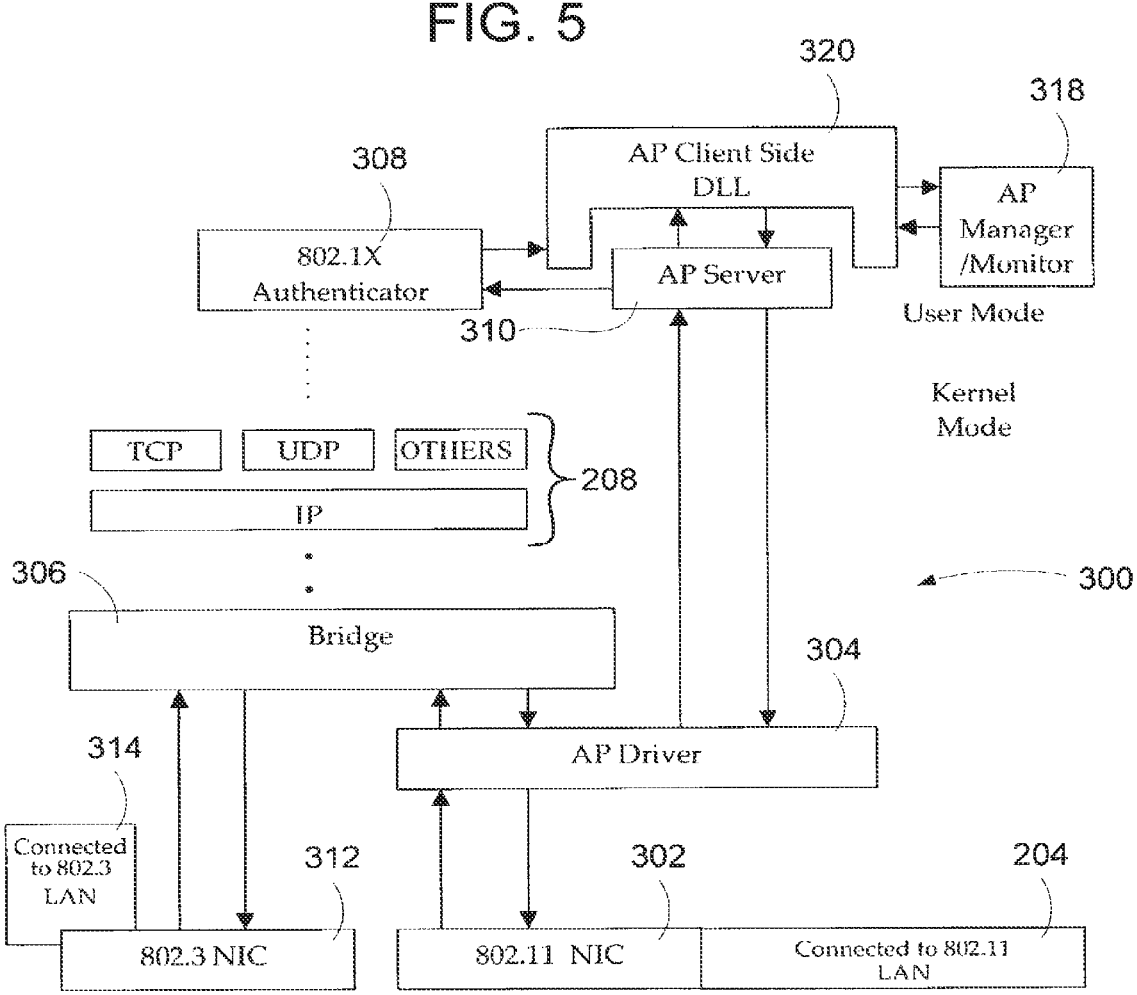
FIG. 5 is a block diagram of the access point of the present invention.

FIG. 5 illustrates the overall architecture of an access point 300 in accordance with the present invention. The 802.11 Physical NIC 302 is connected to a wireless LAN 204. When 802.11 packets are received, NIC 302 passes some 802.11 packets to its protocol, which is AP driver 304. On the send path, the NIC 302 receives 802.11 packets from AP driver 304 and sends them out via wireless LAN 204. The NIC card 302 also performs 802.11 specific hardware operations, in which it may subsume some 802.11 packets instead of indicating them up and also generate 802.11 packets on its own.

AP driver 304 is an 802.3 virtual miniport. It receives 802.11 packets from NIC 302 and converts some 802.11 packets to 802.3 packets before indicating them up to the optional bridge 306. The AP driver 304 also indicates 802.1X packets to 802.1X authenticator 308 via upcalls to AP server 310. On the send path, the AP driver 304 receives 802.3 packets from the bridge 306 and converts them as 802.11 packets before passing them to the NIC 302. AP driver 304 also sends out 802.1X packets received from 802.1X Authenticator 308 via AP server 310. In addition to 802.3 to 802.11 and 802.11 to 803.2 packet conversion, AP driver 304 performs other 802.11 access point operations in software, in which it may subsume some 802.11 packets instead of indicating them up and also generate 802.11 packets on its own.

The 802.3 NIC 312 is connected to a wired LAN 314. The bridge 306 runs on the 802.3 NIC 312 and AP driver 304. 802.1X authenticator 308 sends and receives 802.1X packets destined to and from an 802.1X supplicant 210 via AP server 310. The authenticator 308 also sends and receives 802.1X packets destined to and from an 802.1X authenticator server (not shown) via the bridge 306, which ultimately passes or receives these packets to/from 802.3 NIC 312. Turning briefly back to FIG. 3, the 802.1X authenticator 308 can communicate with SAM database 400 and Radius client 402. The SAM database 400 may send messages to Passport Server 404 or Radius server 406, which may be collocated on same box or over a network.

AP server 310 acts a conduit between all interested user mode applications (like 802.1X authenticator 308, AP manager/monitor 318, etc.) and AP driver 304. The AP server 310 exposes APIs into which interested user mode applications can call into to make a down call to AP driver 304. The AP server 310 also receives a function table from each interested user mode application when the application registers itself with the AP server 310. The AP server 310 uses this function table to pass the upcall from the AP driver 304 to the destined user mode application. The AP client side DLL 320 provides to the capability to remote the APIs exposed by the AP server 310.

Figure 6:
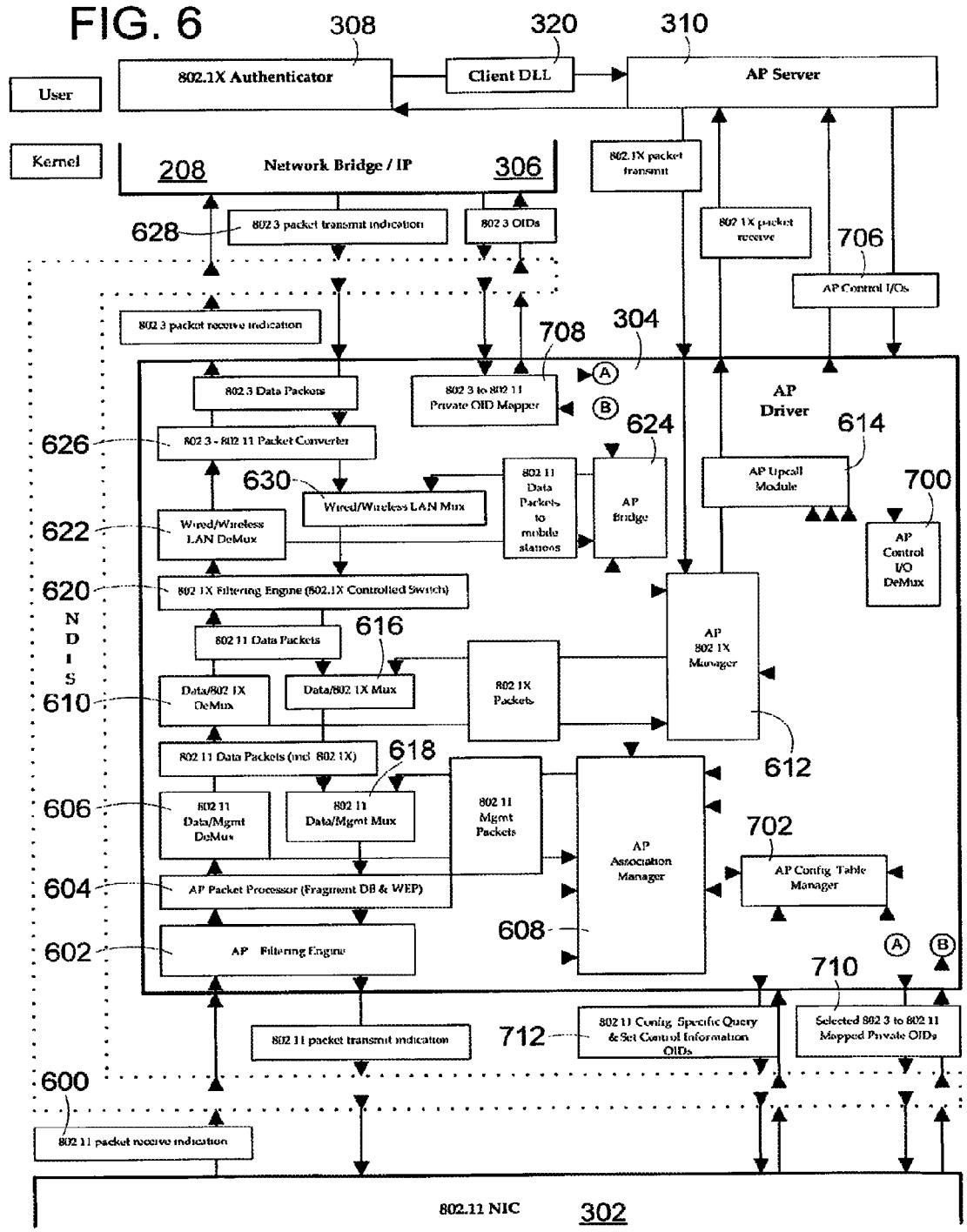
FIG. 6 is a block diagram illustrating the flow of data and commands in the access point in accordance with the present invention.
Figure 7:
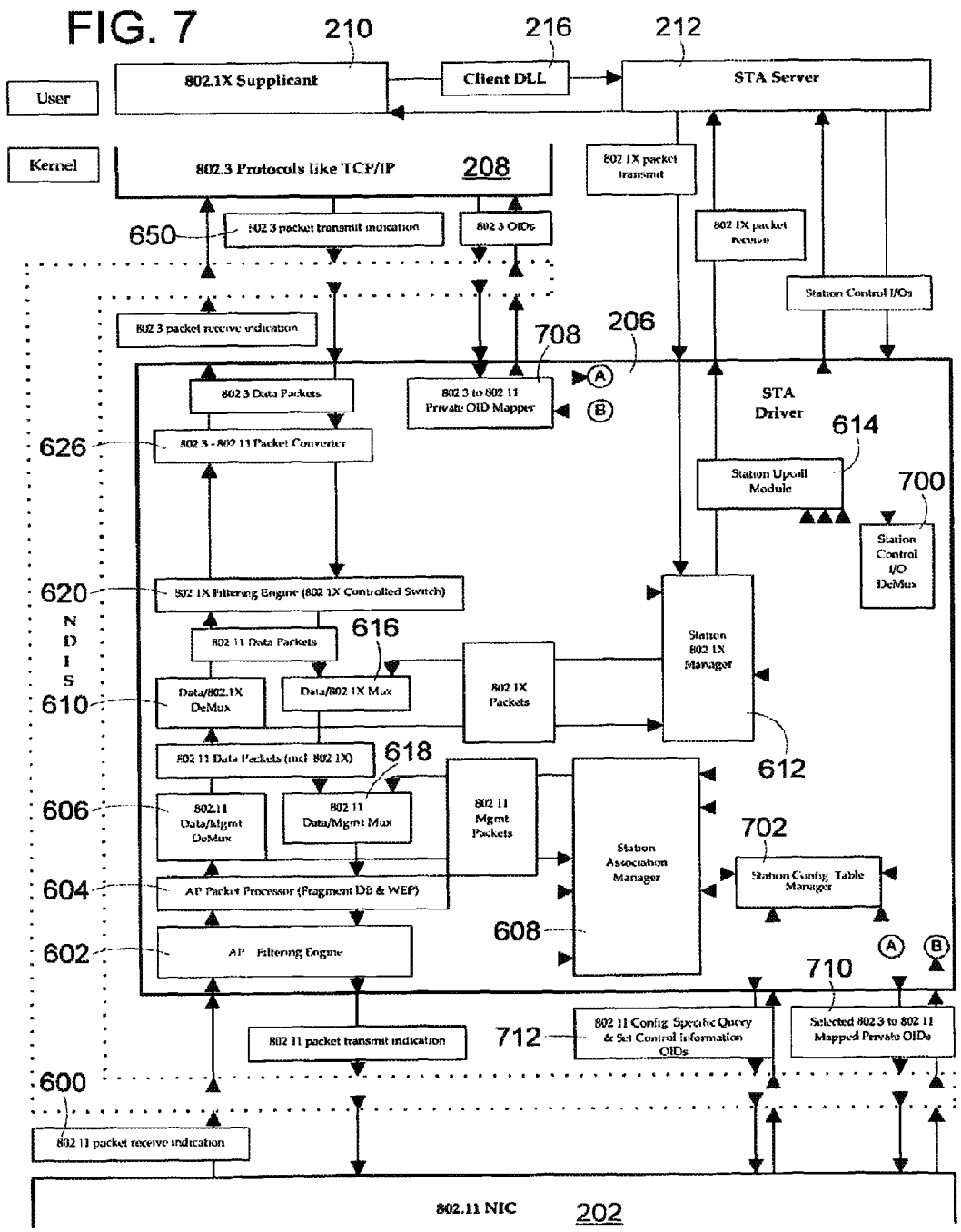
FIG. 7 is a block diagram illustrating the flow of data and commands in the station in accordance with the present invention.
Figure 8:
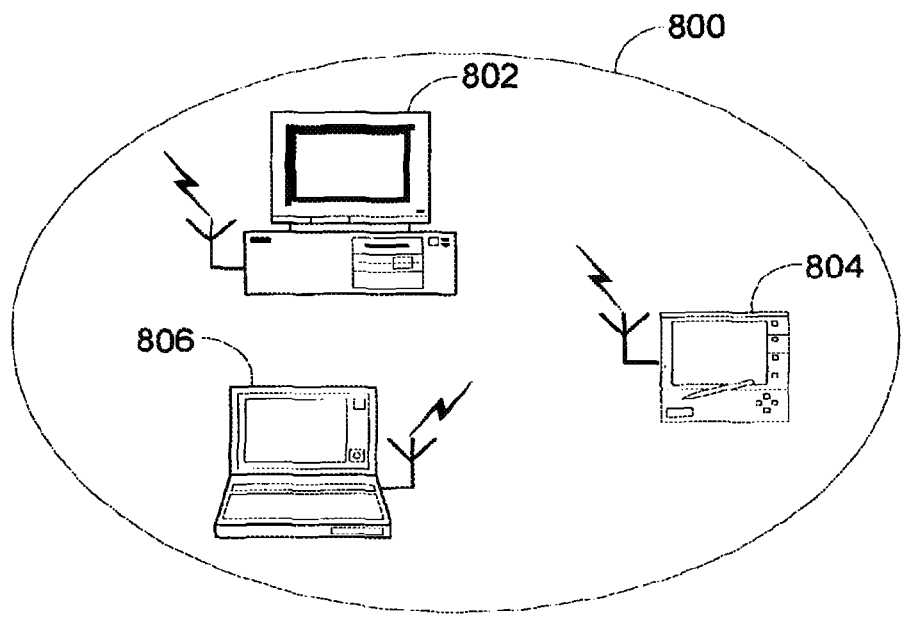
FIG. 8 illustrates an IEEE 802.11 Ad Hoc wireless network.
Figure 10:
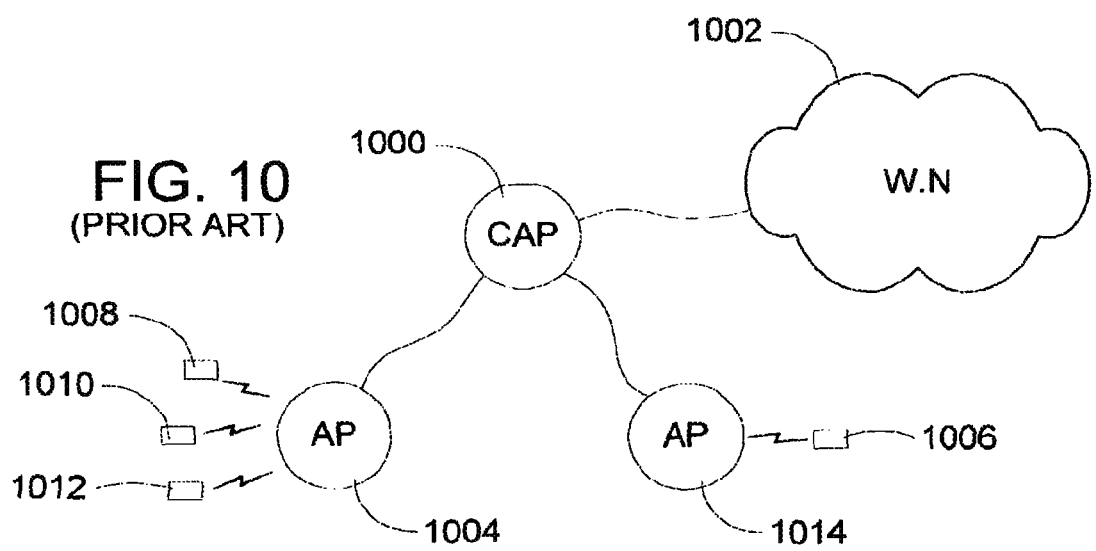
FIG. 10 is a block diagram generally illustrating the limitation of prior art access points and stations.
Figure 9:
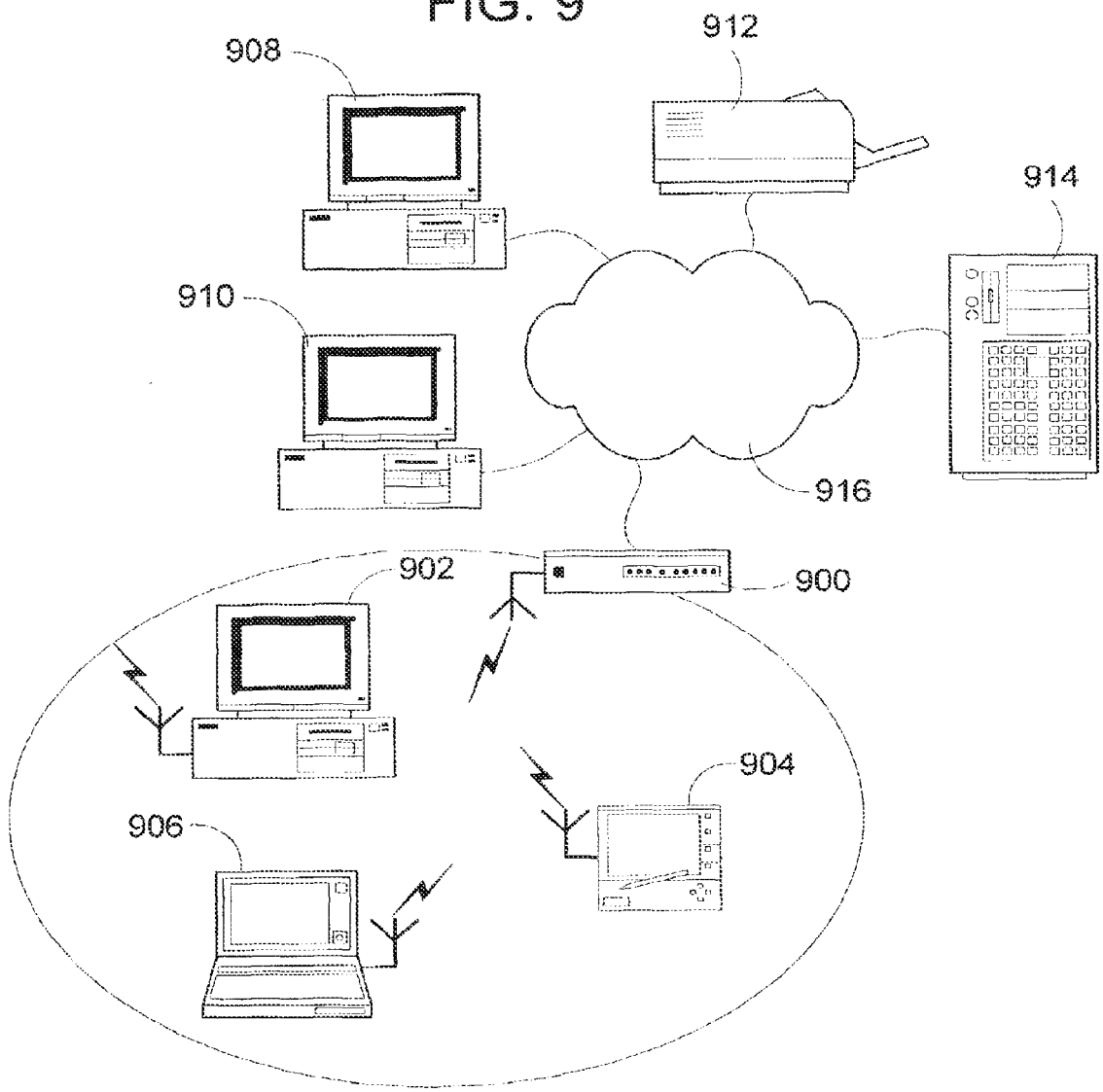
FIG. 9 illustrates an IEEE 802.11 Infrastructure wireless network.

Turning now to FIGS. 6 and 7, the routing of 802.11 packets in a station 200 and access point 300 will now be described. For purposes of explanation, routing in an access point 300 will be described. Once the routing has been described, the functions the NICs 202, 302 perform and the functions the AP driver 304 and station driver 206 perform will be described.

When an 802.11 packet has been received, the NIC 302 sends an 802.11 packet receive indication 600 that provides notice to the AP driver 304 that an 802.11 packet has been received. The filtering engine 602 determines if the packet is to be dropped or indicated up depending on the association state of the packet. The state of the packet indicates the type of packet and the state maintained by the sender of the packet as indicated by an association table. Packets from stations (and other access points) that have been properly authenticated and associated are indicated up. Data packets from stations (and access points) that have not been properly authenticated or associated are dropped. 802.11 management packets are forwarded up to be processed by association manager 608 unless a user has implemented a form of early denial of service check on particular MAC addresses to drop all packets.

The packet processor 604 receives the packet and reassembles the packet if the packet has been fragmented. The initial packets the packet processor 604 receives are known as MPDUs (MAC [media access control] protocol data units). The MPDU packets could be fragments of an MSDU (MAC service data unit). The packet processor 604 decrypts packets that have been encrypted and if the decrypted packets are fragmented, the packet processor 604 reassembles them. The packet processor 604 then sends the MSDU up to the 802.11 data/management demux 606. It should be noted that the NIC 302 may have the ability to decrypt and defragment packets. Hence, depending on the offload/upload capability configured by the driver 206, 304, decryption and defragmentation of the received MPDUs are performed either at the NIC 202, 302 or the driver 206, 304.

The 802.11 data/management demux 606 separates out management packets from data packets. The management packets are sent to the association manager 608, which is where the state engine is maintained for 802.11 associations. The 802.11 data packets are indicated up. They data packets could include 802.1X packets, which are full layer 2 authentication packets. The data/802.1X demux 610 sends 802.1X packets to the 802.1X manager 612. The 802.1X manager 612 has an upcall module 614 to indicate the 802.1X packet up to the 802.1X supplicant 210 (see FIG. 7) or the 802.1X authenticator 308. The authenticator 308 (or supplicant 210) has its own state engine running. If the authenticator 308 (or supplicant 210) needs to send packets, it will give the packets to a client side DLL 320 (216) and the packet will come to the AP server 310 (or station server 212) and the packet will go down via a down call to the 802.1X manager 612 and the packet is sent through the data/802.1X mux 616 and 802.11 data/management mux 618 to the NIC 302 (or NIC 202).

Proceeding on the receive path further, normal 802.11 data packets are sent from the data/802.1X demux 610 to the 802.1X filtering engine 620, which behaves like a 802.1X port. The 802.1X filtering engine 620 allows packets to proceed through the filtering engine 620 only if an 802.1X authentication has occurred for the sending station (or access point). The filtering engine 620 does not allow packets through prior to the sending device being authenticated. Up to this point in the process, the following events have occurred. First, at the 802.11 filtering engine 604, the sending station needs to be associated with the access point 300. Before association, the filtering engine 604 drops all packets (including 802.1X packets) except 802.11 management packets. Once the association is up, 802.11 and 802.1X data packets are allowed but the 802.1X filtering engine 620 drops data packets when the port is closed. As used herein, a port that is closed means that packets are not allowed to pass. A port that is open allows packets to pass. Only 802.1X packets are allowed up to the Authenticator 308, which sends packets back to complete the authentication process. Once authentication is done, the 802.1X filter port 620 is opened for that particular station (i.e., for that particular MAC address). The data packets for that MAC address are indicated up by the 802.1X filtering engine 620.

The wired/wireless LAN demux 622 determines if the packet is ultimately destined to a station that belongs to the same network (i.e., the stations associated with a given access point that are within the access point's cell coverage). If the packet is destined to a station that belongs to the same network, it does not need to go up the path to the IP layer 306 for routing instructions. Instead, the packet is sent to the AP Bridge 624, which will reroute the packet on the transmit path on the same network. If the packet is not destined for a station that belongs to the same network, the packet is sent up to the packet converter 626 where the 802.11 packet is converted to an 802.3 packet and indicated up to either an optional network bridge 306 or it could be IP 208 sitting on top of it. Routing the package through the AP bridge 624 conserves resources because no 802.11 to 802.3 conversion is needed.

On the transmit path, an 802.3 packet transmission indication 630 is received when a packet is being sent from the network bridge 306 or IP layer 208. The 802.3 packet is converted to an 802.11 packet by the packet converter 626 and sent to the wired/wireless LAN Mux 632, which receives packets from the packet converter 626 or from the AP Bridge 624. The packet goes through the 802.1X filtering engine 620. If the 1.X port is closed for the destination MAC address, no 802.11 packets are sent. However, the AP filtering engine 602 allows clear text packets to be sent out before authentication occurs. The data/802.1X mux 616 receives data packets and 802.1X packets. As previously indicated, the 802.1X authenticator 308 (or 802.1X supplicant 210) could be sending packets down to 802.1X manager 612 and the manager 612 generates 802.11 packets for 802.1X packets and gives them to data/802.1X mux 616.

The data packets are sent to the 802.11 data/management demux 616. The association manager 612 could be generating 802.11 management packets and these management packets are multiplexed with the 802.11 data packets. The packets go through the packet processor 604. Fragmentation is first applied and then encryption if necessary. The filtering engine 602 makes sure that only packets for the valid associations are sent out.

Now that data routing has been described, control message routing will now be discussed. There are control I/O calls from the servers 212, 310. The server 212, 310 exposes the APIs that can be called by any of the I/O user mode applications. These calls are transferred from the server 212, 310 through control I/O calls to the control I/O demux 700, which sends the calls to the 802.1X manager 612, to the association manager 608 or to the configuration table manager 702. The configuration table manager 702 holds configuration data for the access point 300 (or station 200). The configuration data includes what type of encryption to use, what type of packets can be accepted, the stations and/or access points in which packets will always be dropped, etc. The configuration table manager 702 can further pass down the calls to the NIC 202, 302. The upcalls are passed up from the configuration table manager 702, from the 802.1X manager 612 or from the association manager 608 to the upcall module 614. These upcalls are transferred via control I/Os 706 to the server 212, 310, which calls the user mode application listening for that call.

The AP 300 and station 200 exposes itself as an 802.3 Media type. It maps 802.3 OIDs (object identifiers) to 802.11 OIDs at private OID mapper 708 and mapper 710. These OIDS, which are described below, are sent to the NIC 202, 302 where they are supported. The configuration OIDS 712 are 802.11 Configuration Specific Query and Set Control Information OIDs. The association manager 608 can also call and set some of the OIDs in the NIC 202, 302.

Now that the overall data and control flow has been described, the partitioning of the 802.11 functions between the driver 204, 304 and the NIC 202, 302 will now be described, including functions that may be offloaded to the NIC 202, 302. In general, functions that are better performed in the operating system (e.g., station 200 or access point 300) are partitioned into the operating system and the remaining functions are placed in the NIC 202, 302. The remaining functions either can't be done in the operating system or are not practical to be done in the operating system. For example, granularity of the operating system on Intel X86 platforms is 5 microseconds. Operations that require greater granularity can not be done in the operating systems, so these operations are placed in the NIC 202, 302. Beacons must be sent periodically (that may in practice vary between 100 msec and higher), which is time consuming and is not practical to perform in the operating system. The NIC 202, 302 can ensure a better periodicity for the transmission of beacons and also ensure that the time-stamping of the beacon is done just prior to its transmission on the air, thereby minimizing the variability in the timestamp that would result in a jitter. As a result, beacon generation is offloaded to the NIC 202, 302.

A NIC implemented in accordance with the present invention must either support station functionality, access point functionality, or both access point and station functionality. Additionally, the NIC must support at least one of Frequency-Hopping Spread Spectrum (FHSS) PHY (physical layer) for the 2.4 GHz band, Direct Sequence Spread Spectrum (DSSS) PHY for the 2.4 GHz ban, or Infrared PHY. Additionally, other PHY standards such as IEEE 802.11g (e.g., higher speed PHY rates in 2.4 GHz using OFDM [orthogonal frequency-division multiplexing] and other optional alternatives such as PBCC [packet binary convolution coding] and CCK [complementary code keying] and IEEE 802.11a (e.g., 5 GHz using OFDM) may be required to be supported by the NIC.

The MAC Protocol capabilities must be supported by either the NIC 202, 302 or the station 200 or access point 300. These capabilities include, authentication services, WEP (Wired Equivalent Privacy protocol) algorithm, distributed coordination function, point coordinator, CF-Pollable (Contention Free-Pollable), fragmentation, defragmentation, MAC data service, multi rate support, multiple outstanding MSDU support, timing synchronization, infrastructure power management, IBSS power management, and association and re-association. Stations and Access Points must provide authentication services. The authentication service includes authentication state, open system authentication, and shared key authentication. These may not be offloaded to a NIC. The WEP algorithm consists of the WEP encryption procedure, the WEP decryption procedure, and security services management and it must be implemented in stations and access points. The WEP encryption procedure and the WEP decryption procedure may be offloaded to a NIC. If WEP is not supported by a NIC, the NIC must support 802.11 extensions to standard NDIS functions as will be described herein.

The distributed coordination function is implemented in the NIC. The distributed coordination function includes the net allocation vector (NAV) function, interframe space usage and timing, the random backoff function, DCF (distributed coordination function) access procedure, recovery procedures and retransmit limits, RTS/CTS (request to send/clear to send) procedure, directed MPDU transfer, broadcast and multicast MPDU transfer, MAC level acknowledgement, and duplicate detection and recovery.

The point coordinator is optional in NICs supporting only access point functionality and is mandatory for the other types of NICs (station only functionality and station and access point functionality). The point coordinator includes maintenance of CFP (contention free period) structure and timing, PCF MPDU (point coordination function MAC protocol data unit) transfer from PC, PCF MPDU transfer to PC, overlapping PC provisions, and polling list maintenance. PCF MPDU transfer to PC is optional. If PCF MPDU transfer to PC is supported, polling list maintenance must be supported. CF-Pollable must be implemented in the NIC. CF-Pollable includes interpretation of CFP structure and timing, PCF MPDU transfer to/from CF-Pollable stations, and polling list update.

Fragmentation and defragmentation of packets must be implemented in stations and access points. The fragmentation and defragmentation of packets may be implemented in the NIC. If fragmentation or defragmentation functionality is implemented by the NIC, then the NIC must implement WEP offload. If fragmentation or defragmentation functionality is not implemented in the NIC, the NIC must support 802.11 extensions to standard NDIS functions as will be described herein.

MAC data service is implemented in the NIC. MAC data service includes reorderable multicast service class and strictly ordered service class. Reorderable multicast service class is mandatory and strictly ordered service class is optional. Multi rate support is implemented in the NIC. Multiple outstanding MSDU support and multiple outstanding MSDU transmission restrictions are implemented in stations, access points, and NICs.

Timing synchronization is implemented in the NIC. The NIC must support beacon generation, TST synchronization and accuracy, passive scanning, active scanning, and probe response. NICS that support access point functionality must support timing in an infrastructure network, and infrastructure BSS (basic service set) initialization. NICs that support station functionality must support timing in an independent BSS (IBSS) and independent BSS initialization. NICs that support FHSS PHY for the 2.4 GHz band must support the hop synchronization function. The NICs may be required to support other PHY standards such as IEEE 802.11g and IEEE 802.11a Infrastructure power management is implemented in the NIC. NICs that support station functionality shall provide station power management modes and implement the receive function during CP. NICs that support access point functionality shall implement TIM transmission, AP function during CP, and the aging function. NICs that provide the point coordinator function must implement the AP function during CFP. NICs that provide CF-pollable functionality must implement the receive function during CFP.

IBSS power management is implemented in NICs that support station functionality. The IBSS power management function includes initialization of the IBSS power management, station power state transitions, and ATIM (announcement traffic indication message) and frame transmission.

Association and reassociation functionality is implemented in stations and access points. This functionality includes providing an association state, the station or access point association procedure, and the station or access point reassociation procedure. These functions should not be implemented in the NIC.

The station and access points support MAC frame functionality with some frame functionality implemented in NICs. MAC frame functionality includes transmission capability, reception capability, frame exchange sequences, and MAC addressing functions. Specifically, transmission capability includes association and reassociation request functionality, association and reassociation response functionality, disassociation, authentication, and deauthentication functionality, probe request, probe response and beacon functionality, PS-poll functionality, RTS, CTS and ACK functions, CF-End, CF-End+CF-Ack, Data, Data+CF-Ack, Data+CF-Poll, Data+CF-Ack+CF-Poll, NULL, CF-Ack (no data), CF-Poll (no data), CF-Ack+CF-Poll (no data) functionality. Association and reassociation request functionality is implemented in stations, and association and reassociation response functionality is implemented in access points. Disassociation, authentication, and deauthentication functionality is implemented in stations and access points. Probe response and beacon functionality is implemented in NICs. NICs that support station functionality must implement the probe request function and PS-poll functionality. RTS, CTS and ACK functions are implemented in NICs. CF-End and CF-End+CF-Ack functions are implemented in NICs that provide point coordinator functionality. The Data function is implemented in stations and access points. The NULL functionality is implemented in NICs. NICs that provide PCF MPDU transfer to PC functionality also implement Data+CF-Poll, Data+CF-Ack+CF-Poll, CF-Poll (no data), and CF-Ack+CF-Poll (no data) functionality. Data+CF-Ack and CF-Ack (no data) functionality is implemented in NICs that provide point coordinator functionality or CF-Pollable functionality.

MAC frame reception capability includes association and reassociation request functionality, association and reassociation response functionality, disassociation, authentication, and deauthentication functionality, probe request, probe response and beacon functionality, ATIM, PS-Poll functionality, RTS, CTS and ACK functions, CF-End, CF-End+CF-Ack, Data, Data+CF-Ack, Data+CF-Poll, Data+CF-Ack+CF-Poll, NULL, CF-Ack (no data), CF-Poll (no data), CF-Ack+CF-Poll (no data) functionality. Association and reassociation request functionality is implemented in access points, and association and reassociation response functionality is implemented in stations. Disassociation, authentication, and deauthentication functionality is implemented in stations and access points. Probe response and beacon functionality is implemented in stations, access points, and NICs. NICs that support station functionality must implement the ATIM functionality. NICs that support access point functionality must implement the PS-Poll function. RTS, CTS, ACK, CF-End and CF-End+CF-Ack, Data+CF-Ack, and NULL functionalities are implemented in NICs. The Data function is implemented in stations and access points. NICs that provide CF Pollable functionality implement Data+CF-Poll, Data+CF-Ack+CF-Poll, CF-Poll (no data), and CF-Ack+CF-Poll (no data) functionality. CF-Ack (no data) functionality is implemented in NICs that provide point coordinator functionality or CF-Pollable functionality.

The frame exchange sequences include basic frame sequences and CF-frame sequences. Basic frame sequence functionality is implemented in NICs. CF-Frame sequence functionality is implemented in NICs that provide point coordinator functionality or CF-Pollable functionality.

MAC addressing functions include station universal IEEE 802 address functionality, BSS identifier generation, and receive address matching. Station universal IEEE 802 address functionality and receive address matching is implemented in stations, access points, and NICs. BSS identifier generation is implemented in stations and access points.

Now that the partitioning of the 802.11 functions between stations, access points and NICs of the present invention has been described, the communication calls between the stations, access points, and NICs will now be described.

Stations and access points can offload functions to the NIC. OID Calls are used to query the NIC to determine the capabilities of a NIC. The OID calls for determining the capability of a NIC are OID_DOT11_Offload_Capability, OID_DOT11_Current_Offload_Capability, OID_DOT11_Operation_Mode_Capability, OID_DOT11_Optional_Capability, OID_DOT11_WEP_Offload, OID_DOT11_WEP_Upload, OID_DOT11_Default_WEP_Offload, OID_DOT11_Default_WEP_Upload, and OID_DOT11_MPDU_Maximum_Length. The OID_DOT11_Offload_Capability call provides the station or access point the functions that the NIC supports. The functions that may be offloaded include WEP, fragmentation, and defragmentation. If WEP is supported, the NIC also returns the maximum number of WEP rows that can be offloaded to the NIC. The OID_DOT11_Current_Offload_Capability call provides the current offload capabilities of the NIC. The OID_DOT11_WEP_Offload call is used to offload a WEP row into the NIC and specifies the algorithm to be used, the direction of the WEP row, the MAC address of the peer, the key length in bytes, and the call contains the actual key. The NIC 202, 302 returns a handle to the station 200 or access point 300. The OID_DOT11_WEP_Upload call is used to upload a specified WEP row from the NIC. The OID_DOT11_Default_WEP_Offload call offloads a default WEP row into the NIC. This call also specifies the algorithm to be used, the index in the default WEP table at which the WEP row needs to be populated, the address type on which the WEP row applies, the key length in bytes, and the call contains the actual key. The OID_DOT11_Default_WEP_Upload call is used to upload a default WEP row from the NIC. The OID_DOT11_MPDU_Maximum_Length call is used to query the NIC to determine the maximum MPDU length that is supported by the NIC.

The stations and access points use configuration calls to configure the underlying NIC. These calls include OID_DOT11_Operation_Mode_Capability, OID_DOT11_Current_Operation_Mode, OID_DOT11_Current_Packet_Filter, OID_DOT11_ATIM_Window, OID_DOT11_Scan_Request, OID_DOT11_Current_PHY_Type, OID_DOT11_Join_Request, OID_DOT11_Start_Request, OID_DOT11_Reset_Request, OID_DOT11_Optional_Capability, and OID_DOT11_Current_Optional_Capability. The OID_DOT11_Operation_Mode_Capability call is used to determine the operation mode capability supported by the NIC. The NIC returns a value that indicates whether the NIC supports only station functionality, only access point functionality, or both station functionality and access point functionality. The OID_DOT11_Current_Operation_Mode call is used to set the operation mode in which the NIC will start to operate. The operation modes are station only mode, access point only mode, or station and access point mode. The OID_DOT11_Current_Packet_Filter call is used to indicate which packets types the NIC supports by setting the appropriate flag. The flags include 802.11 unicast control packets, 802.11 unicast management packets, 802.11 unicast data packets, 802.11 multicast control packets, 802.11 multicast management packets, 802.11 multicast data packets, 802.11 broadcast control packets, 802.11 broadcast management packets, 802.11 broadcast data packets, promiscuous mode (all 802.11 packets) and all 802.11 multicast packets. The OID_DOT11_ATIM_Window call is used to determine and set the ATIM window size. The OID_DOT11_Scan_Request call is used to request a survey of potential BSSs that a station may later elect to try to join. The OID_DOT11_Current_PHY_Type call is used to query and set the current physical medium type that should be used by the NIC. The OID_DOT11_Join_Request call is used to request the NIC to synchronize with a BSS. The OID_DOT11_Start_Request call is used to request the NIC to start a BSS. The OID_DOT11_Reset_Request call is used to request the NIC to reset itself. The OID_DOT11_Optional_Capability call is used to determine the optional point coordinator function capabilities supported by the NIC. The OID_DOT11_Current_Optional_Capability call is used to query and set the current optional capabilities in the NIC.

OID calls are also used to determine and set MIB (management information base) parameters. These calls are OID_DOT11_Station_ID, OID_DOT11_Medium_Occupancy_Limit, OID_DOT11_CF_Pollable, OID_DOT11_CFP_Period, OID_DOT11_CFP_Max_Duration, OID_DOT11_Power_Mgmt_Mode Operational_Rate_Set, OID_DOT11_Beacon_Period, OID_DOT11_DTIM_Period, OID_DOT11_WEP_ICV_Error_Count, OID_DOT11_MAC_Address, OID_DOT11_RTS_Threshold, OID_DOT11_Short_Retry_Limit, OID_DOT11_Long_Retry_Limit, OID_DOT11_Fragmentation_Threshold, OID_DOT11_Max_Transmit_MSDU_Lifetime, OID_DOT11_Max_Receive_Lifetime, OID_DOT11_Counters_Entry, OID_DOT11_Supported_PHY_Types, OID_DOT11_Current_Reg_Domain, OID_DOT11_Temp_Type, OID_DOT11_Current_TX_Antenna, Diversity_Support, OID_DOT11_Current_RX_Antenna, OID_DOT11_Supported_Power_Levels, OID_DOT11_Current_TX_Power_Level, OID_DOT11_Hop_Time, OID_DOT11_Current_Channel_Number, OID_DOT11_Max_Dwell_Time, OID_DOT11_Current_Dwell_Time, OID_DOT11_Current_Set, OID_DOT11_Current_Pattern, OID_DOT11_Current_Index, OID_DOT11_Current_Channel, OID_DOT11_CCA_Mode_Supported, OID_DOT11_Current_CCA_Mode, OID_DOT11_ED_Threshold, OID_DOT11_CCA_Watchdog_Timer_Max, OID_DOT11_CCA_Watchdog_Count_Max, OID_DOT11_CCA_Watchdog_Timer_Min, OID_DOT11_CCA_Watchdog_Count_Min, OID_DOT11_Reg_Domains_Support_Value, OID_DOT11_Supported_TX_Antenna, OID_DOT11_Supported_RX_Antenna, OID_DOT11_Diversity_Selection_RX, OID_DOT11_Supported_Data_Rates_Value.

The OID_DOT11_Station_ID call is used to determine the station ID and set the station ID. This allows a manager to identify a station for its own purposes while keeping the true MAC address independent. The OID_DOT11_Medium_Occupancy_Limit call is used to determine and set the maximum amount of time, in TU, that a point coordinator may control the usage of the wireless medium without relinquishing control for long enough to allow at least one instance of DSF (data service facility) access to the medium. The OID_DOT11_CF_Pollable call is used to determine if the station is able to respond to a CF-Poll with a data frame within a SIFS time. The OID_DOT11_CFP_Period call is used to determine and set the number of DTIM (delivery traffic indication message) intervals between the start of CFPs. The OID_DOT11_CFP_Max_Duration call is used to determine and set the maximum duration of the CFP in TU that may be generated by the PCF. The OID_DOT11_Power_Mgmt_Mode call is used to determine and set the power management mode of the station. It indicates whether the station is in power-save mode. The OID_DOT11_Operational_Rate_Set call is used to determine and set the set of data rates at which the station may transmit data. The OID_DOT11_Beacon_Period call is used to determine and set the beacon period (i.e., the number of TU that a station shall use for scheduling Beacon transmissions). The OID_DOT11_DTIM_Period call is used to determine the DTIM period (i.e., the number of beacon intervals that shall relapse between transmissions of Beacon frames containing a TIM element whose DTIM Count field is zero). The OID_DOT11_WEP_ICV_Error_Count call is used to determine the WEP ICV (integrity check value) error count value.

The OID_DOT11_MAC_Address call is used to determine the unique MAC address assigned to the station. The OID_DOT11_RTS_Threshold call is used to determine and set the RTS threshold value. The value indicates the number of octets in an MPDU below which an RTS/CTS handshake shall not be performed. The OID_DOT11_Short_Retry_Limit call is used to determine and set the maximum number of transmission attempts of a frame, the length of which is less than or equal to the RTS threshold, before a failure condition is indicated. The OID_DOT11_Long_Retry_Limit call is used to determine and set the maximum number of transmission attempts of a frame, the length of which is greater than the RTS threshold before a failure condition is indicated. The OID_DOT11_Fragmentation_Threshold call is used to determine and set the current maximum size of the MPDU that may be delivered to the PHY layer. An MSDU shall be broken into fragments if its size exceeds the value of this attribute after adding MAC headers and trailers. The OID_DOT11_Max_Transmit_MSDU_Lifetime call is used to determine and set the maximum transmit MSDU lifetime value, after which further attempts to transmit the MSDU shall be terminated. The OID_DOT11_Max_Receive_Lifetime call is used to determine and set the elapsed time after the initial reception of a fragmented MPDU or MSDU after which further attempts to reassemble the MPDU or MSDU shall be terminated.

The OID_DOT11_Counters_Entry call is used to determine the 802.11 statistics counters settings. The counters include counters for the number of transmitted fragments, the number of multicast transmitted frames, the number of failed transmissions, the number of successful retransmissions, the number of duplicate frames, the number of times a CTS is received and not received in response to an RTS, the number of times when an ACK is not received when expected, the number of received fragments, the number of multicast frames received, and the number of successfully transmitted MSDUs. The OID_DOT11_Supported_PHY_Types call is used to determine the physical medium types supported by the NIC. The OID_DOT11_Current_Reg_Domain call is used to determine the current regulatory domain the present instance of the PMD (Physical Medium Dependent) is supporting. The OID_DOT11_Temp_Type call is used to determine the operating temperature range capability (e.g, 0 to 40 degrees C., −30 to 70 degrees C.) of the physical layer. The OID_DOT11_Current_TX_Antenna call is used to determine and set the current antenna being used to transmit. The Diversity_Support call is used to determine the diversity support value. The OID_DOT11_Current_RX_Antenna call is used to determine and set the current antenna being used to receive.

The OID_DOT11_Supported_Power_Levels call is used to determine the number of supported power levels and the transmit output power in milliwatts for all the supported power levels. The OID_DOT11_Current_TX_Power_Level call is used to determine and set the current transmit power level. The OID_DOT11_Hop_Time call is used to determine the time in microseconds for the PMD to change from channel 2 to channel 80. The OID_DOT11_Current_Channel_Number call is used to determine and set the current channel number of the frequency output by the RF synthesizer. The OID_DOT11_Max_Dwell_Time call is used to determine the maximum time in TU that the transmitter is permitted to operate on a single channel. The OID_DOT11_Current_Dwell_Time call is used to determine and set the current time in TU that the transmitter shall operate on a single channel, as set by the MAC.

The OID_DOT11_Current_Set call is used to determine and set the current set of patterns the PHY LME (layer management entity) is using to determine the hopping sequence. The OID_DOT11_Current_Pattern call is used to determine and set the current pattern the PHY LME is using to determine the hopping sequence. The OID_DOT11_Current_Index call is used to determine and set the current index value the PHY LME is using to determine the current channel number. The OID_DOT11_Current_Channel call is used to determine and set the current operating frequency channel of the DSSS PHY. The OID_DOT11_CCA_Mode_Supported call is used to determine the supported CCA (Clear Channel Assessment) mode. The OID_DOT11_Current_CCA_Mode call is used to determine and set the current CCA method in operation. The OID_DOT11_ED_Threshold call is used to determine and set the current energy detect threshold being used by the DSSS PHY. The OID_DOT11_CCA_Watchdog_Timer_Max call is used to determine and set the maximum CCA watch dog timer value. The OID_DOT11_CCA_Watchdog_Count_Max call is used to determine and set the maximum CCA watch dog count value. The OID_DOT11_CCA_Watchdog_Timer_Min call is used to determine and set the minimum CCA watch dog timer value. The OID_DOT11_CCA_Watchdog_Count_Min call is used to determine and set the minimum CCA watch dog count value. The OID_DOT11_Reg_Domains_Support_Value call is used to determine the regulatory domains the PLCP and PMD support in the present implementation. The OID_DOT11_Supported_TX_Antenna call is used to determine and set the supported transmit antenna truth values. The OID_DOT11_Supported_RX_Antenna call is used to determine and set the supported receive antenna truth values. The OID_DOT11_Diversity_Selection_RX call is used to determine and set the receive diversity selection truth values. The OID_DOT11_Supported_Data_Rates_Value call is used to determine the supported transmit and receive data rate values.

The access point and station of the present invention also support private 802.11 calls. These calls are OID_DOT11_Maximum_Lookahead, OID_DOT11_Current_Lookahead, OID_DOT11_Current_Packet_Filter, OID_DOT11_Current_Address, and OID_DOT11_Permanent_Address. These private 802.11 calls are generic MAC layer functions exposed to the NDIS layer. OID_DOT11_Maximum_Lookahead is the maximum amount of lookahead buffer supported by the NIC miniport driver to provide a preview version of a received packet to the upper NDIS layer for it to determine whether to accept the particular packet or discard it. OID_DOT11_Current_Lookahead is the size of the lookahead buffer being used. OID_DOT11_Current_Packet_Filter is the packet filter currently being used by the station 200 or access point 300. OID_DOT11_Current_Address is the IEEE 49-bit address currently being used by the station 200 or access point 300. OID_DOT11_Permanent_Address is the IEEE 48-bit address that is resident in the non-volatile portion of the NIC 202, 302 that is pre-programmed by the NIC manufacturer.

Communication between an access point (or a station) and user mode applications have IOCTL (I/O control) calls that provide the same functions as described above that allow user mode applications to determine and set NIC parameters (i.e., they map to the OIDs defined above). For example, IOCTL_DOT11_Operation_Mode_Capability maps to OID_DOT11_Operation_Mode_Capability. In addition, IOCTL calls are provided to allow applications to determine or determine and set access point (or station) parameters. These calls include software infrastructure configuration calls and software infrastructure MIB calls. The software infrastructure configuration calls include IOCTL_DOT11_Current_BSSID, IOCTL_DOT11_Desired_BSSID, IOCTL_DOT11_Current_SSID, IOCTL_DOT11_Current_BSS_TYPE, IOCTL_DOT11_Exclude__8021X, IOCTL_DOT11_Associate, IOCTL_DOT11_Disassociate, IOCTL_DOT11_Query_Adapter_List, IOCTL_DOT11_Query_BSSID_List, IOCTL_DOT11_Send_8021X_Pkt, IOCTL_DOT11_Receive_Upcall, IOCTL_DOT11_Check_Adapter, IOCTL_DOT11_8021X_State, and IOCTL_DOT11_8021X_Filter. The software infrastructure MIB calls include IOCTL_DOT11_Authentication_Response_Time_Out, IOCTL_DOT11_Privacy_Option_Implemented, IOCTL_DOT11_Desired_SSID, IOCTL_DOT11_Desired_BSS_Type, IOCTL_DOT11_Association_Response_Time_Out, IOCTL_DOT11_Disassociated_Peer, IOCTL_DOT11_Deauthenticated_Peer, IOCTL_DOT11_Authentication_Failed_Peer, IOCTL_DOT11_Authentication_Algorithm, IOCTL_DOT11_WEP_Default_Key_Value, IOCTL_DOT11_WEP_Key_Mapping, IOCTL_DOT11_Privacy_Invoked, IOCTL_DOT11_WEP_Default_Key_Id, IOCTL_DOT11_WEP_Key_Mapping_Length, IOCTL_DOT11_Exclude_Unencrypted, IOCTL_DOT11_WEP_Excluded_Count, IOCTL_DOT11_Dissassociate_Notification, IOCTL_DOT11_Deauthenticate_Notification, IOCTL_DOT11_Authenticate_Fail_Notification, IOCTL_DOT11_WEP_Undecryptable_Count, and IOCTL_DOT11_Group_Address calls.

The IOCTL_DOT11_Current_BSSID call is used to determine the MAC address of an associated access point of a station. If the station is not associated to an access point, then the station returns a zeroed out MAC address. The IOCTL_DOT11_Desired_BSSID call is used to determine or set the MAC address of the access point to which association is desired. The IOCTL_DOT11_Current_SSID call is used to determine the SSID of an associated access point. The IOCTL_DOT11_Current_BSS_TYPE call is used to determine the current BSS type in which a station is operating. The IOCTL_DOT11_Exclude_8021X call is used to determine or set the exclude 802.1X truth value. The IOCTL_DOT11_Associate call is used to request a station to associate itself with an access point based upon the current values of desired BSSID, desired SSID, and desired BSS type parameters.

The IOCTL_DOT11_Disassociate call is used to request a station to disassociate with a currently associated access point. An error code is returned if a station is not associated with an access point. On a successful disassociation, a Media Disconnect is generated by the station. The IOCTL_DOT11_Query_Adapter_List call is used to determine the list of virtual adapters that the station driver 206 (or access point driver 304) currently has. The IOCTL_DOT11_Query_BSSID_List call is used to determine the current BSS description list. The IOCTL_DOT11_Send_8021X_Pkt call is used request the station or access point to send an 802.1X packet.

The IOCTL_DOT11_Receive_Upcall call is used to pend the call so that the station driver or access point driver sends the requesting application upcall information when the station driver or access point driver receives an upcall request. When this call is made and if the station driver or access point driver already has an outstanding upcall, then the driver fills in a buffer with the outstanding upcall information and immediately completes the call. If there are no outstanding requests, then the station driver (or access point driver) returns a STATUS_PENDING and completes the call when an upcall request is received. The types of upcalls made are a scan confirm, a reset confirm, an 802.1X packet send confirm, an 802.1X packet receive indication, a disassociate notification, a deauthenticate notification, and an authenticate failure notification. Upcalls for access points also include an associate indication and a disassociate indication. The IOCTL_DOT11_Check_Adapter call is used to request the station or access point to check for a given adapter's existence. The IOCTL_DOT11_8021X_State call is used to determine or set the 802.1X state on a particular instance. The IOCTL_DOT11_8021X_Filter call is used to determine or set the 802.1X filters on a particular station or access point virtual miniport instance.

The IOCTL_DOT11_Authentication_Response_Time_Out call is used to determine or set the authentication response time out value. The time out value is the time that a responding station should wait for the next frame in an authentication response. The IOCTL_DOT11_Privacy_Option_Implemented call is used to determine the privacy option implemented truth value. When set to true, it indicates that the WEP option is implemented. The IOCTL_DOT11_Desired_SSID call is used to determine or set the desired service set ID used in the desired SSID parameter of the most recent scan. The IOCTL_DOT11_Desired_BSS_Type call is used to determine or set the desired BSS type. The IOCTL_DOT11_Association_Response_Time_Out call is used to determine or set the association response time out value, which is the time that a requesting station should wait for a response to a transmitted association-request MMPDU. The IOCTL_DOT11_Disassociated_Peer call is used to determine the last disassociation reason and address of the last disassociated station. The IOCTL_DOT11_Deauthenticated_Peer call is used to determine the last deauthentication reason and address of the last deauthenticated station. The IOCTL_DOT11_Authentication_Failed_Peer call is used to determine the last authentication failure reason and the address of the last station for which authentication failed.

The IOCTL_DOT11_Authentication_Algorithm call is used to determine the list of all the authentication algorithms supported by a station and their states. The call is also used to set the states for the list of authentication algorithms. The IOCTL_DOT11_WEP_Default_Key_Value call is used to set the default WEP key value at the specified index. The IOCTL_DOT11_WEP_Key_Mapping call is used to determine the list of WEP key mappings or set the WEP key mapping at a specified index. The IOCTL_DOT11_Privacy_Invoked call is used to determine or set the privacy invoked truth value. When set to true, the value indicates that the WEP mechanism is being used for transmitting frames of type data. The IOCTL_DOT11_WEP_Default_Key_Id call is used to determine or set the WEP default key ID value for the specified element (i.e., the first, second, third, or fourth element of the WEP default key array). The IOCTL_DOT11_WEP_Key_Mapping_Length call is used to determine or set the WEP key mapping length. The IOCTL_DOT11_Exclude_Unencrypted call is used to determine or set the exclude unencrypted truth value. When set to true, a station shall not indicate at the MAC service interface received MSDUs that have the WEP subfield of the Frame Control field equal to zero. The IOCTL_DOT11_WEP_Excluded_Count call is used to determine the WEP excluded count. The IOCTL_DOT11_Dissassociate_Notification call is used to determine or set the disassociate notification truth value.

When this truth value is set to true, a disassociate notification is sent whenever a station sends a disassociation frame. The disassociate notification includes the MAC address of the MAC to which the disassociation frame was sent and the reason for the disassociation. The IOCTL_DOT11_Deauthenticate_Notification call is used to determine and set the deauthentication notification truth value. When set to true, a deauthenticate notification is sent whenever a station sends a deauthentication frame. The deauthenticate notification includes the MAC address of the MAC to which the deauthenticate frame was sent and the reason for the deauthentication. The IOCTL_DOT11_Authenticate_Fail_Notification call is used to determine and set the authenticate fail notification truth value. When set to true, a authenticate failure notification is sent whenever a station sends a deauthentication frame. The deauthenticate notification includes the MAC address of the MAC to which the deauthenticate frame was sent and the reason for the deauthentication. The IOCTL_DOT11_WEP_Undecryptable_Count call is used to determine the WEP undecrypted count. The IOCTL_DOT11_Group_Address call is used to determine the list of multicast addresses and their row status and set the multicast address and row status at a specified index.

Now that the IOCTL calls have been described, the 802.11 extensions to standard NDIS functions will be described. The NIC 202, 302 must implement these extensions as they are described below.

If the NIC 202, 302 supports fragmentation offload then it must support WEP offload. In this case, the interaction is at MSDU level except when WEP keys are not offloaded or the NIC 202, 302, does not support the required WEP algorithm. If the WEP keys are not offloaded or the WEP algorithm is not supported, the interaction also includes the MSDU represented as a chain of one or more MPDUs.

If the NIC 202, 302 supports WEP offload but does not support fragmentation offload then in addition to the MSDU the interaction also includes the MSDU represented as a chain of one or more MPDUs and the station driver 206 or access point driver 304 applies fragmentation if needed and the fragments are sent in MPDUs. If the NIC 202, 302 does not support fragmentation offload or WEP offload, the interaction between the NIC and the station 200 or access point 300 also includes the MSDU represented as a chain of one or more MPDUs and the station 200 or access point 300 applies fragmentation (fragments are sent in MPDUs) and/or WEP (WEP is applied after fragmentation).

In addition to the NDIS_PACKET, the access point 300 and station 200 passes information specific to the 802.11 protocol to the NIC 202, 302. The pointer to this 802.11 extension information can be retrieved through the command Ndis_Get_Packet_Media_Specific_Info. This command returns a pointer to the media specific info, which is actually a pointer to DOT11_Send_Extension_Info. The NIC 202, 302 must retrieve the extension information of an outgoing packet using Ndis_Get_Packet_Media_Specific_Info. The information included in the response to this command includes information necessary to retrieve the MPDU from an MDL chain. The packet descriptor can describe either a single MSDU or all MPDUs (fragments) of a single MSDU.

Other information that is provided is a uDontFragment bit, a hWEPOffload handle and the number of fragments. The uDontFragment bit denotes whether the NIC 202, 302 can fragment the packet. The hWEPOffload handle is a handle to the WEP row to be used for encrypting the packet (if it is not fragmented) or for encrypting each fragment of the packet (if it is fragmented). The station 200 or access point 300 guarantees that the handle value that it passes here remains valid for the duration of the call. If the NIC 202, 302 supports fragmentation offload, then it must support WEP offload. If the NIC 202, 302 does not support fragmentation offload, then the station 200 or access point 300 applies fragmentation if needed. The access point 300 or station 200 applies WEP encryption if the NIC 202, 302 does not support WEP encryption. If fragmentation in hardware is not supported and the NIC 202, 302 can not send the packet unfragmented, then the NIC 202, 302 returns an appropriate status up. On receiving that status code, the station 200 or access point 300 will re-query the fragmentation threshold and maximum MPDU size from the NIC 202, 302.

The NIC 202, 302 must use the supplied 802.11 send extension information in specific ways. The following enumerates how the 802.11 NIC must use the supplied 802.11 send extension information:

1) uDontFragment bit is clear, Number Of Fragments=0 and hWEPOffload is NULL

The NIC 202, 302 uses the top level NDIS_PACKET structure to get the description of the packet buffer chain, fragment the packet if necessary and does not apply WEP to each fragment of the packet (if the packet is fragmented) or to the packet (if the packet is not fragmented).

2) uDontFragment bit is clear, Number Of Fragments=0 and hWEPOffload is not NULL The NIC 202, 302 uses the top level NDIS_PACKET structure to get the description of the packet buffer chain, fragment the packet if necessary, use hWEPOffload handle value to locate the WEP key and apply WEP to each fragment of the packet (if the packet is fragmented) or to the packet (if the packet is not fragmented). In either case, the NIC needs to allocate buffers for ICV and IV. The reason the upper layer doesn't allocate the ICV or IV in this case is because it doesn't know whether the NIC 202, 302 will fragment the packet (MPDU maximum length state in the NIC can be changed dynamically by the NIC depending upon the PHY error rate).

3) uDontFragment bit is clear, Number Of Fragments>1 and hWEPOffload is NULL

The station 200/access point 300 guarantees that this case never occurs as when uDontFragment bit is clear, the NIC 202, 302 supports fragmentation in hardware.

4) uDontFragment bit is clear, Number Of Fragments>1 and hWEPOffload is not NULL The station 200/access point 300 guarantees that this case never occurs as when uDontFragment bit is clear, the NIC 202, 302 supports fragmentation in hardware (which implies that it also supports WEP offload).

5) uDontFragment bit is set, Number Of Fragments=0 and hWEPOffload is NULL

The NIC 202, 302 uses the top level NDIS_PACKET structure to get the description of the packet buffer chain, does not fragment the packet and does not apply WEP to the packet before transmitting it on air.

6) uDontFragment bit is set, Number Of Fragments=0 and hWEPOffload is not NULL

The NIC 202, 302 uses the top level NDIS_PACKET structure to get the description of the packet buffer chain, does not fragment the packet and uses the hWEPOffload handle value to locate the WEP key and apply WEP to the packet. In this case, the NIC 202, 302 does not need to allocate buffers for ICV and IV as the station 200/access point 300 will ensure that the buffers for ICV and IV are already allocated for the packet.

7) uDontFragment bit is set, Number Of Fragments>1 and hWEPOffload is NULL

In this scenario, the buffer chain of the top level NDIS_PACKET describes all MPDUs. The NIC 202, 302 should use the array of DOT11_FRAGMENT_DESCRIPTOR structures (the Dot11FragmentDescriptors field of DOT11_SEND_EXTENSION_INFO structure) from MediaSpecificInformation pointer of the top level NDIS_PACKET structure to get the offset and length of each fragment (number of fragments is equal to usNumberOfFragments) and do not apply WEP to each fragment before transmitting it on air.

8) uDontFragment bit is set, Number Of Fragments>1 and hWEPOffload is not NULL

In this scenario, the buffer chain of the top level NDIS_PACKET describes all MPDUs. The NIC 202, 302 should use the array of DOT11_FRAGMENT_DESCRIPTOR structures (the Dot11FragmentDescriptors field of DOT11_SEND_EXTENSION_INFO structure) from the MediaSpecificInformation pointer of the top level NDIS_PACKET structure to get the offset and length of each fragment (number of fragments is equal to usNumberOfFragments) and use hWEPOffload handle value to locate the WEP key and apply WEP to each fragment before transmitting it on air. In this case, the NIC does not need to allocate buffers for ICV and IV as the station 200/access point 300 will ensure that the buffers for ICV and IV are already allocated for each fragment of the packet.

If there's any failure while processing the packet, the NIC should indicate an appropriate status and should also update appropriate statistics in its configuration table. The status codes returned should be one or more of the following (these are defined in a later section): DOT11_STATUS_SUCCESS—For successful transmit or receipt of a MSDU; DOT11_STATUS_RETRY_LIMIT_EXCEEDED—Undeliverable for an unacknowledged directed MSDU when the ShortRetryMax or LongRetryMax retry limit would otherwise be exceeded. Type of status—Failure; DOT11_STATUS_UNSUPPORTED_PRIORITY—For unsupported priority for priorities other than Contention or ContentionFree. Type of status—Failure; DOT11_STATUS_UNSUPPORTED_SERVICE_CLASS—For unsupported service class for service classes other than ReorderableMulticast or StrictlyOrdered. Type of status—Failure; DOT11_STATUS_UNAVAILABLE_PRIORITY—For unavailable priority for ContentionFree when no point coordinator is available, in which case the MSDU is transmitted with a provided priority of Contention. Type of status—Informational; DOT11_STATUS_UNAVAILABLE_SERVICE_CLASS—For unavailable service class for StrictlyOrdered service when the station's power management mode is other than "active". Type of status—Informational; DOT11_STATUS_XMIT_MSDU_TIMER_EXPIRED—Undeliverable when TransmitMSDUTimer reached aMaxTransmitMSDULifetime before successful delivery. Type of status—Failure; DOT11_STATUS_UNAVAILABLE_BSS—Undeliverable as no BSS was available. Type of status—Failure; DOT11_STATUS_EXCESSIVE_DATA_LENGTH—For excessive data length packet if uDontFragment bit is set and the card can not send the packet unfragmented. Type of status—Failure; and DOT11_STATUS_ENCRYPTION_FAILED—Failed to encrypt the packet for any reason. Type of status—Failure.

In addition to the NDIS_PACKET, the NIC 202, 302 shall pass up information specific to the 802.11 protocol. The pointer to the extension information can be retrieved through Ndis_Get_Packet_Media_Specific_Info. The 802.11 NIC must use Ndis_Set_Packet_Media_Specific_Info to set the extension information of an incoming packet. The NDIS packet descriptor containing the DOT11_Recv_Extension_Info will describe a reassembled full size packet (only if the NIC 202, 302 has performed reassembly) or a packet that is not a fragment while the pNdisPackets in the DOT11_Recv_Extension_Info will describe the fragments only if fragments were received and were not reassembled. The top level NDIS packet descriptor containing DOT11_Recv_Extension_Info will not describe any packet buffer chain in the case when the packet was received as a set of fragments and was not reassembled. It will either describe a reassembled or a non-fragmented packet (MSDU). In case of MSDU, it will remove the ICV and IV buffers before indicating it up.

Other information that is set by the NIC 202, 302 includes priority, received signal strength in dBm and in a qualitative metric across all physical media types, status, number of MPDUs received, number of fragments and an array of pointers to NDIS-Packet structures. The priority setting specifies reception processing priority that was used for the data unit transfer. The allowed values are Contention or Contention-Free. The status information contains the status filled by the NIC 202, 302 when it indicates a MSDU up. If the status is success, this field contains DOT11_Status_Success plus any informational status codes if applicable (all applicable status codes need to be OR'ed). If the NIC 202, 302 encounters a failure before it could indicate the packet up, then it should drop the packet and update appropriate statistics in its configuration table. In this case, the NIC 202, 302 must not indicate the packet up. The number of MPDUs received contains the number of MPDUs received by the NIC 202, 302 to form the MSDU that is being indicated up and it must contain a value that is greater than or equal 1 and less than DOT11_MaxNum_Of_Fragments. The number of fragments contains the number of fragments returned by the NIC 202, 302. If the NIC 202, 302 supports defragmentation offload, then it must support WEP offload. If the NIC 202, 302 does not support defragmentation offload, then the station 200/access point 300 applies defragmentation if needed. If the NIC 202, 302 also does not support WEP offload, then the station 200/access point 300 applies WEP decryption.

The following enumerates how the NIC 202, 302 must fill in the 802.11 receive extension information in each of the following scenarios.

1): Packet received is not a fragment and WEP does not need to be applied to the packet Set 802.11 receive extension information in the following way before indicating the packet up: Status=DOT11_Status_Success, Number Of MPDUs Received=1, Number Of Fragments=0, and pointer to array NULLed out. The top level NDIS_PACKET must describe the packet buffer chain.

If there's any failure before the NIC 202, 302 could indicate the packet to NDIS then the NIC 202, 302 should drop the packet and update appropriate statistics in its configuration table.

2): Packet received is not a fragment, WEP needs to be applied to the packet and WEP key needed is not available in the card or WEP in hardware is unsupported Set 802.11 receive extension information in the following way before indicating the packet up: Status=DOT11_STATUS_SUCCESS|DOT11_ STA- TUS_WEP_KEY_UNAVAILABLE, Number Of MPDUs Received=1, Number Of Fragments=0, pointer to array NULLed out. The top level NDIS_PACKET must describe the packet buffer chain.

If there's any failure before the NIC 202, 302 could indicate the packet to NDIS then the NIC 202, 302 should drop the packet and update appropriate statistics in its configuration table.

3): Packet received is not a fragment, WEP needs to be applied to the packet and WEP key needed is available in the card Set 802.11 receive extension information in the following way before indicating the packet up: Status=DOT11_STATUS_SUCCESS|DOT11_STATUS_ICV_VERIFIED, Number Of MPDUs Received=1, Number Of Fragments=0, pointer to array NULLed out. The top level NDIS_PACKET must describe the packet buffer chain.

If there's any failure before the NIC 202, 302 could indicate the packet to NDIS then the NIC 202, 302 should drop the packet and update appropriate statistics in its configuration table.

4): Packet received is a fragment, all fragments have been received within the fragment receive time interval and WEP does not need to be applied to the fragments Set 802.11 receive extension information in the following way before indicating the packet up:
  If the card supports defragmentation in hardware then the values should be as follows: Status=DOT11_STATUS_SUCCESS|DOT11_STATUS_PACKET_REASSEMBLED, Number Of MPDUs Received=Number of fragments received, Number Of Fragments=0, pointer to array NULLed out. The top level NDIS_PACKET must describe the reassembled packet buffer chain.
  If the card doesn't support defragmentation in hardware then the values should be as follows: Status=DOT11_STATUS_SUCCESS|DOT11_STATUS_PACKET_NOT_REASSEMBLED, Number Of MPDUs Received=Number of fragments received, Number Of Fragments=Number of fragments received, pointer is to an array of NDIS_PACKET structures with the number of entries in the array equal to the number of fragments received. Top level NDIS_PACKET must describe the packet buffer chain of the first fragment in order to bypass the NDIS checking (NDIS doesn't allow zero-length packet)
  If there's any failure before the NIC 202, 302 could indicate the reassembled packet or fragments to NDIS then the NIC 202, 302 should drop the fragments and update appropriate statistics in its configuration table.

5): Packet received is a fragment, all fragments have been received within the fragment receive time interval, WEP needs to be applied to the fragments and WEP key needed is not available in the card or WEP in hardware is unsupported Set 802.11 receive extension information in the following way before indicating the packet up: Status=DOT11_STATUS_SUCCESS|DOT11_STATUS_PACKET_NOT_REASSEMBLED|DOT11_STATUS_WEP_KEY_UNAVAILABLE, Number Of MPDUs Received=Number of fragments received, Number Of Fragments=Number of fragments received, Pointer to an array of NDIS_PACKET structures with the number of entries in the array equal to the number of fragments received. Top level NDIS_PACKET must describe the packet buffer chain of the first fragment.

If there's any failure before the NIC 202, 302 could indicate the fragments to NDIS then the NIC 202, 302 should drop the fragments and update appropriate statistics in its configuration table.

6): Packet received is a fragment, all fragments have been received within the fragment receive time interval, WEP needs to be applied to the fragments and WEP key needed is available in the card Set 802.11 receive extension information in the following way before indicating the packet up: If the card supports defragmentation in hardware then the values should be as follows: Status=DOT11_STATUS_SUCCESS|DOT11_STATUS_PACKET_REASSEMBLED|DOT11_STATUS_ICV_VERIFIED, Number Of MPDUs Received=Number of fragments received, Number Of Fragments=0, pointer to array is NULLed out. The top level NDIS_PACKET must describe the packet buffer chain of the first fragment in order to bypass the NDIS checking (NDIS doesn't allow zero-length packet)

If the card doesn't support defragmentation in hardware then the values should be as follows: Status=DOT11_STATUS_SUCCESS|DOT11_STATUS_PACKET_NOT_REASSEMBLED|DOT11_STATUS_ICV_VERIFIED, Number Of MPDUs Received=Number of fragments received, Number Of Fragments=Number of fragments received, pointer is to an array of NDIS_PACKET structures with the number of entries in the array equal to the number of fragments received. The top level NDIS_PACKET must describe the packet buffer chain of the first fragment in order to bypass the NDIS checking (NDIS doesn't allow zero-length packet)

If there's any failure before the NIC 202, 302 could indicate the reassembled packet or fragments to NDIS then the NIC 202, 302 should drop the fragments and update appropriate statistics in its configuration table.

Now that the OID and IOCTL calls and IOCTL calls and the 802.11 extensions to the standard NDIS functions have been described, the interaction between the NIC 202, 302 and the station 200/access point 300 and the expected sequence of operations the NIC 202, 302 may be asked to perform will now be described for various operation modes. The sequence of events that will be described is a typical set of events.

A NIC supporting a station 200 operating in the infrastructure mode may be asked to perform the following sequence of operations after a reboot or a software reset. Those skilled in the art will recognize that only portions of the sequence of operations might be executed in each pass since the previous software reset or reboot.

The station 200 may query the capabilities of the NIC 202. The calls made to the NIC 202 includes the following OID calls: OID_DOT11_Offload_Capability, OID_DOT11_Operation_Mode_Capability, OID_DOT11_Optional_Capability, OID_DOT11_CF_Pollable, OID_DOT11_Operational_Rate_Set, OID_DOT11_Supported_PHY_Types, OID_DOT11_Diversity_Support, OID_DOT11_Supported_Power_Levels, OID_DOT11_Reg_Domains_Support_Value, and OID_DOT11_Supported_Data_Rates_Value. Once the capabilities are known, the station 200 may optionally set current capabilities of the NIC 202. This includes the following OID calls: OID_DOT11_Current_Offload_Capability, OID_DOT11_Current_Operation_Mode, OID_DOT11_Current_Phy_Type, OID_DOT11_Current_Optional_Capability, and OID_DOT11_Diversity_Selection_RX.

The station 200 may also query and set NIC parameters via OID calls. These parameters are the ones that are not affected by the current state of the 802.11 LAN in which they will be operating. Set calls are made for only those parameters whose default values need to be changed. List of parameters which may be changed or queried at this point are: OID_DOT11_Temp_Type, OID_DOT11_MPDU_Max_Length, OID_DOT11_MAC_Address, OID_DOT11_Station_ID, OID_DOT11_Current_TX_Antenna, OID_DOT11_Current_RX_Antenna, OID_DOT11_Current_TX_Power_Level, OID_DOT11_Supported_TX_Antenna, and OID_DOT11_Supported_RX_Antenna. For NICs supporting FHSS PHY, the list of parameters also includes: OID_DOT11_Hop_Time, OID_DOT11_Current_Channel_Number, OID_DOT11_Max_Dwell_Time, OID_DOT11_Current_Dwell_Time, OID_DOT11_Current_Set, OID_DOT11_Current_Pattern, and OID_DOT11_Current_Index. For NICs supporting DSSS PHY the list of parameters also includes: OID_DOT11_Current_Channel, OID_DOT11_CCA_Mode_Supported, OID_DOT11_Current_CCA_Mode, OID_DOT11_ED_Threshold. For NICs supporting IR PHY the list of parameters also includes: OID_DOT11_CCA_Watchdog_Timer_Max, OID_DOT11_CCA_Watchdog_Count_Max, OID_DOT11_CCA_Watchdog_Timer_Min, and OID_DOT11_CCA_Watchdog_Count_Min.

The station 200 issues a scan request (active or passive) OID call (OID_DOT11_Scan_Request). The beacon and probe response frames during the scan are indicated using the rules of the miniport receive path extension as explained in the discussion on 802.11 extensions to standard NDIS functions. These rules apply to all received packets.

Once a scan request has been successfully completed, the station 200 may optionally query and set NIC parameters via OIDs. These parameters are the ones that are affected by the current state of the 802.11 LAN in which they will be operating. Set calls are made for only those parameters whose default values need to be changed. List of parameters which may be changed or queried at this point include: OID_DOT11_Operational_RateSet, OID_DOT11_Current_Reg_Domain (the call requires that a passive scan has been performed by the NIC 202), OID_DOT11_Current_TX_Antenna, OID_DOT11_Current_RX_Antenna, OID_DOT11_Current_TX_Power_Level, OID_DOT11_Supported_TX_Antenna, OID_DOT11_Supported_RX_Antenna, and OID_DOT11_Diversity_Selection_RX. For NICs supporting FHSS PHY, the list of parameters also includes: OID_DOT11_Hop_Time, OID_DOT11_Current_Channel_Number, OID_DOT11_Max_Dwell_Time, Current_Dwell_Time, OID_DOT11_Current_Set, OID_DOT11_Current_Pattern, and OID_DOT11_Current_Index. For NICs supporting DSSS PHY the list of parameters also includes: OID_DOT11_Current_Channel, OID_DOT11_CCA_Mode_Supported, OID_DOT11_Current_CCA_Mode, OID_DOT11_ED_Threshold. For NICs supporting IR PHY the list of parameters also includes: OID_DOT11_CCA_Watchdog_Timer_Max, OID_DOT11_CCA_Watchdog_Count_Max, OID_DOT11_CCA_Watchdog_Timer_Min, and OID_DOT11_CCA_Watchdog_Count_Min.

The station 200 may send the NIC 202 a join request (OID_DOT11_Join_Request) to an Infrastructure BSS. Once a join request has been successfully completed, the NIC 202 may on its own or may be asked to do the following:

1) Follow the rules of miniport send path extension as explained above in the 802.11 extensions to standard NDIS functions to process and send the packets given to the NIC 202 by the station 200. The NIC 202 may be queried using the following OID calls when it changes parameters associated with these OIDs and notifies the station 200 of the change through NDIS indications: OID_DOT11_MPDU_Max_Length.
2) Additionally, the NIC 202 may follow the rules of miniport receive path extension explained above in the 802.11 extensions to standard NDIS functions to process the received packets and pass them up to the station 200. If the NIC 202 supports WEP offload/upload, the NIC 202 may be offloaded a WEP row or an already offloaded WEP row may be uploaded at any time using the OID_DOT11_WEP_Offload, OID_DOT11_WEP_Upload, OID_DOT11_Default_WEP_Offload, and OID_DOT11_Default_WEP_Upload calls.
3) Process scan requests (OID_DOT11_Scan_Request) when asked
4) Always indicate probe response and beacon frames up. Also, indicate selected ACK packets received for certain packet transmissions. NDIS send path extension is used to indicate for which of the transmitted packet should the received ACK packets be indicated up
5) Process all parameter query requests on Read-Only and Read-Write OIDs (including statistics OIDs like OID_DOT11_WEP_ICV_ERROR_COUNT and OID_DOT11_COUNTERS_ENTRY). In addition, the list of parameters which may be changed at this point include:
OID_DOT11_Current_Packet_Filter,
OID_DOT11_Power_Mgmt_Mode,
OID_DOT11_RTS_Threshold,
OID_DOT11_Short_Retry_Limit,
OID_DOT11_Long_Retry_Limit,
OID_DOT11_Fragmentation_Threshold,
OID_DOT11_Max_Transmit_MSDU_Lifetime, and
OID_DOT11_Max_Receive_Lifetime The station 200 may also issue a NIC software reset request (Reset_Request), which is different than the NDIS reset request. This software reset requests the NIC 202 to prepare itself for a new join or a new start request with some intervening configuration OIDs and/or scan request OID. The request also has a flag that tells the NIC 202 whether to preserve the current settings or to reload the default settings. Upon successful completion of this request, the station 200 can repeat the expected operation sequence for any one of the four configurations depending upon the capabilities of the NIC, surrounding 802.11 LAN state and user requested configuration.

A NIC supporting a station 200 operating in an IBSS join mode may be asked to perform the following sequence of operations after a reboot or a software reset. Those skilled in the art will recognize that only portions of the sequence of operations might be executed in each pass since the previous software reset or reboot.

The station 200 may query the capabilities of the NIC 202. The calls made to the NIC 202 includes the following OID calls: OID_DOT11_Offload_Capability, OID_DOT11_Operation_Mode_Capability, OID_DOT11_Optional_Capability, OID_DOT11_Operational_Rate_Set, OID_DOT11_Supported_Phy_Types, OID_DOT11_Diversity_Support, OID_DOT11_Supported_Power_Levels, OID_DOT11_Reg_Domains_Support_Value, and OID_DOT11_Supported_Data_Rates_Value. Once the capabilities are known, the station 200 may optionally set current capabilities of the NIC 202. This includes the following OID calls: OID_DOT11_Current_Offload_Capability, OID_DOT11_Current_Operation_Mode, OID_DOT11_Current_Phy_Type, OID_DOT11_Current_Optional_Capability, and OID_DOT11_Diversity_Selection_RX.

The station 200 may also query and set NIC parameters via OID calls. These parameters are the ones that are not affected by the current state of the 802.11 LAN in which they will be operating. Set calls are made for only those parameters whose default values need to be changed. List of parameters which may be changed or queried at this point are: OID_DOT11_Temp_Type, OID_DOT11_MPDU_Max_Length, OID_DOT11_MAC_Address, OID_DOT11_Station_ID, OID_DOT11_Current_TX_Antenna, OID_DOT11_Current_RX_Antenna, OID_DOT11_Current_TX_Power_Level, OID_DOT11_Supported_TX_Antenna, and OID_DOT11_Supported_RX_Antenna. For NICs supporting FHSS PHY, the list of parameters also includes: OID_DOT11_Hop_Time, OID_DOT11_Current_Channel_Number, OID_DOT11_Max_Dwell_Time, OID_DOT11_Current_Dwell_Time, OID_DOT11_Current_Set, OID_DOT11_Current_Pattern, and OID_DOT11_Current_Index. For NICs supporting DSSS PHY the list of parameters also includes: OID_DOT11_Current_Channel, OID_DOT11_CCA_Mode_Supported, OID_DOT11_Current_CCA_Mode, OID_DOT11_ED_Threshold. For NICs supporting IR PHY the list of parameters also includes: OID_DOT11_CCA_Watchdog_Timer_Max, OID_DOT11_CCA_Watchdog_Count_Max, OID_DOT11_CCA_Watchdog_Timer_Min, and OID_DOT11_CCA_Watchdog_Count_Min.

The station 200 issues a scan request (active or passive) OID call (Scan_Request). The beacon and probe response frames during the scan are indicated using the rules of the miniport receive path extension as explained in the discussion on 802.11 extensions to standard NDIS functions. These rules apply to all received packets.

Once a scan request has been successfully completed, the station 200 may optionally query and set NIC parameters via OIDs. These parameters are the ones that are affected by the current state of the 802.11 LAN in which they will be operating. Set calls are made for only those parameters whose default values need to be changed. List of parameters which may be changed or queried at this point include: OID_DOT11_ATIM_Window, OID_DOT11_Operational_Rate_Set, OID_DOT11_Beacon_Period, OID_DOT11_Current_Reg_Domain (the call requires that a passive scan has been performed by the NIC 202), OID_DOT11_Current_TX_Antenna, OID_DOT11_Current_RX_Antenna, OID_DOT11_Current_TX_Power_Level, OID_DOT11_Supported_TX_Antenna, OID_DOT11_Supported_RX_Antenna, and OID_DOT11_Diversity_Selection_RX. For NICs supporting FHSS PHY, the list of parameters also includes: OID_DOT11_Hop_Time, OID_DOT11_Current_Channel_Number, OID_DOT11_Max_Dwell_Time, OID_DOT11_Current_Dwell_Time, OID_DOT11_Current_Set, OID_DOT11_Current_Pattern, and OID_DOT11_Current_Index. For NICs supporting DSSS PHY the list of parameters also includes: OID_DOT11_Current_Channel, OID_DOT11_CCA_Mode_Supported, OID_DOT11_Current_CCA_Mode, OID_DOT11_ED_Threshold. For NICs supporting IR PHY the list of parameters also includes: OID_DOT11_CCA_Watchdog_Timer_Max, OID_DOT11_CCA_Watchdog_Count_Max, OID_DOT11_CCA_Watchdog_Timer_Min, and OID_DOT11_CCA_Watchdog_Count_Min.

The station 200 may send the NIC 202 a start request (Start_Request). Once a start request has been successfully completed, the NIC 202 may on its own or may be asked to do the following:

1) The NIC 202 must send out periodic beacon frames and must reply to probe requests frames by probe responses.
2) Follow the rules of Miniport Send Path Extension as explained above in the 802.11 extensions to standard NDIS functions to process and send the packets given to the NIC 202 by the station 200. The NIC 202 may be queried using the following OID calls when it changes parameters associated with these OIDs and notifies the station 200 of the change through NDIS indications: OID_DOT11_MPDU_Max_Length.
2) Additionally, the NIC 202 may follow the rules of miniport receive path extension explained above in the 802.11 extensions to standard NDIS functions to process the received packets and pass them up to the station 200. If the NIC 202 supports WEP offload/upload, the NIC 202 may be offloaded a WEP row or an already offloaded WEP row may be uploaded at any time using the OID_DOT11_WEP_Offload, OID_DOT11_WEP_Upload, OID_DOT11_Default_WEP_Offload, and OID_DOT11_Default_WEP_Upload calls.
3) Process scan requests (OID_DOT11_Scan_Request) when asked
4) Always indicate probe response and beacon frames up. Also, indicate selected ACK packets received for certain packet transmissions. NDIS send path extension is used to indicate for which of the transmitted packet should the received ACK packets be indicated up
5) Process all parameter query requests on Read-Only and Read-Write OIDs (including statistics OIDs like OID_DOT11_WEP_ICV_ERROR_COUNT and OID_DOT11_COUNTERS_ENTRY). In addition, the list of parameters which may be changed at this point include: OID_DOT11_Current_Packet_Filter, OID_DOT11_Power_Mgmt_Mode, OID_DOT11_RTS_Threshold, OID_DOT11_Short_Retry_Limit, OID_DOT11_Long_Retry_Limit,
OID_DOT11_Fragmentation_Threshold,
OID_DOT11_Max_Transmit_MSDU_Lifetime, and
OID_DOT11_Max_Receive_Lifetime The station 200 may also issue a NIC software reset request (OID_DOT11_Reset_Request), which is different than the NDIS reset request. This software reset requests the NIC 202 to prepare itself for a new join or a new start request with some intervening configuration OIDs and/or scan request OID. The request also has a flag that tells the NIC 202 whether to preserve the current settings or to reload the default settings. Upon successful completion of this request, the station 200 can repeat the expected operation sequence for any one of the four configurations depending upon the capabilities of the NIC, surrounding 802.11 LAN state and user requested configuration.

A NIC supporting an access point 300 may be asked to perform the following sequence of operations after a reboot or a software reset. Those skilled in the art will recognize that only portions of the sequence of operations might be executed in each pass since the previous software reset or reboot.

The access point 300 may query the capabilities of the NIC 302. The OIDs described herein are representative for the PHY used. Different OIDs may be specified that are specific to other PHY layers. The calls made to the NIC 302 includes the following OID calls: OID_DOT11_Offload_Capability, OID_DOT11_Operation_Mode_Capability, OID_DOT11_Optional_Capability, OID_DOT11_Operational_Rate_Set, OID_DOT11_Supported_PHY_Types, OID_DOT11_Diversity_Support, OID_DOT11_Supported_Power_Levels, OID_DOT11_Reg_Domains_Support_Value, and OID_DOT11_Supported_Data_Rates_Value. Once the capabilities are known, the access point 300 may optionally set current capabilities of the NIC 302. This includes the following OID calls: OID_DOT11_Current_Offload_Capability, OID_DOT11_Current_Operation_Mode, OID_DOT11_Current_PHY_Type, OID_DOT11_Current_Optional_Capability, and OID_DOT11_Diversity_Selection_RX.

The access point 300 may also query and set NIC parameters via OID calls. These parameters are the ones that are not affected by the current state of the 802.11 LAN in which they will be operating. Set calls are made for only those parameters whose default values need to be changed. List of parameters which may be changed or queried at this point are: OID_DOT11_Temp_Type, OID_DOT11_MPDU_Max_Length, OID_DOT11_MAC_Address, OID_DOT11_Station_ID, OID_DOT11_Medium_Occupancy_Limit, OID_DOT11_CFP_Max_Duration, OID_DOT11_Current_Reg_Domain, OID_DOT11_Current_TX_Antenna, OID_DOT11_Current_RX_Antenna, OID_DOT11_Current_TX_Power_Level, OID_DOT11_Supported_TX_Antenna, and OID_DOT11_Supported_RX_Antenna. For NICs supporting FHSS PHY, the list of parameters also includes: OID_DOT11_Hop_Time, OID_DOT11_Current_Channel_Number, OID_DOT11_Max_Dwell_Time, OID_DOT11_Current_Dwell_Time, OID_DOT11_Current_Set, OID_DOT11_Current_Pattern, and OID_DOT11_Current_Index. For NICs supporting DSSS PHY the list of parameters also includes: OID_DOT11_Current_Channel, OID_DOT11_CCA_Mode_Supported, OID_DOT11_Current_CCA_Mode, and OID_DOT11_ED_Threshold. For NICs supporting IR PHY the list of parameters also includes: OID_DOT11_CCA_Watchdog_Timer_Max, OID_DOT11_CCA_Watchdog_Count_Max, OID_DOT11_CCA_Watchdog_Timer_Min, and OID_DOT11_CCA_Watchdog_Count_Min.

The access point 300 issues a scan request (active or passive) OID call (Scan_Request). The beacon and probe response frames during the scan are indicated using the rules of the miniport receive path extension as explained in the discussion on 802.11 extensions to standard NDIS functions. These rules apply to all received packets.

Once a scan request has been successfully completed, the access point 300 may optionally query and set NIC parameters via OIDs. These parameters are the ones that are affected by the current state of the 802.11 LAN in which they will be operating. Set calls are made for only those parameters whose default values need to be changed. List of parameters which may be changed or queried at this point include: OID_DOT11_Operational_Rate_Set, OID_DOT11_Beacon_Period, OID_DOT11_DTIM_Period, OID_DOT11_Current_TX_Antenna, OID_DOT11_Current_RX_Antenna, OID_DOT11_Current_TX_Power_Level, OID_DOT11_Supported_TX_Antenna, OID_DOT11_Supported_RX_Antenna, and OID_DOT11_Diversity_Selection_RX. For NICs supporting FHSS PHY, the list of parameters also includes: OID_DOT11_Hop_Time, OID_DOT11_Current_Channel_Number, OID_DOT11_Max_Dwell_Time, OID_DOT11_Current_Dwell_Time, OID_DOT11_Current_Set, OID_DOT11_Current_Pattern, and OID_DOT11_Current_Index. For NICs supporting DSSS PHY the list of parameters also includes: OID_DOT11_Current_Channel, OID_DOT11_CCA_Mode_Supported, OID_DOT11_Current_CCA_Mode, and OID_DOT11_ED_Threshold. For NICs supporting IR PHY the list of parameters also includes: OID_DOT11_CCA_Watchdog_Timer_Max, OID_DOT11_CCA_Watchdog_Count_Max, OID_DOT11_CCA_Watchdog_Timer_Min, and OID_DOT11_CCA_Watchdog_Count_Min.

The access point 300 may send the NIC 302 a start request (Start_Request) when operating in an infrastructure mode. Once a start request has been successfully completed, the NIC 302 may on its own or may be asked to do the following:

1) Send out periodic beacon frames and must reply to probe requests frames by probe responses.
2) Follow the rules of miniport send path extension as explained above in the 802.11 extensions to standard NDIS functions to process and send the packets given to the NIC 302 by the access point 300. The NIC 302 may be queried using the following OID calls when it changes parameters associated with these OIDs and notifies the access point 300 of the change through NDIS indications: OID_DOT11_MPDU_Max_Length.
3) Additionally, the NIC 302 may follow the rules of miniport receive path extension explained above in the 802.11 extensions to standard NDIS functions to process the received packets and pass them up to the access point 300. If the NIC 302 supports WEP offload/upload, the NIC 302 may be offloaded a WEP row or an already offloaded WEP row may be uploaded at any time using the OID_DOT11_WEP_Offload, OID_DOT11_WEP_Upload, OID_DOT11_Default_WEP_Offload, and OID_DOT11_Default_WEP_Upload calls.

3) Process scan requests (OID_DOT11_Scan_Request) when asked
4) Always indicate probe response and beacon frames up. Also, indicate selected ACK packets received for certain packet transmissions. NDIS send path extension is used to indicate for which of the transmitted packet should the received ACK packets be indicated up
5) Process all parameter query requests on Read-Only and Read-Write OIDs (including statistics OIDs like OID_DOT11_WEP_ICV_ERROR_COUNT and OID_DOT11_COUNTERS_ENTRY). In addition, the list of parameters which may be changed at this point include: OID_DOT11_Current_Packet_Filter, OID_DOT11_Power_Mgmt_Mode, OID_DOT11_RTS_Threshold, OID_DOT11_Short_Retry_Limit, OID_DOT11_Long_Retry_Limit, OID_DOT11_Fragmentation_Threshold, OID_DOT11_Max_Transmit_MSDU_Lifetime, and OID_DOT11_Max_Receive_Lifetime The station 200 may also issue a NIC software reset request (OID_DOT11_Reset_Request), which is different than the NDIS reset request. This software reset requests the NIC 302 to prepare itself for a new join or a new start request with some intervening configuration OIDs and/or scan request OID. The request also has a flag that tells the NIC 302 whether to preserve the current settings or to reload the default settings. Upon successful completion of this request, the access point 300 can repeat the expected operation sequence for any one of the four configurations depending upon the capabilities of the NIC, surrounding 802.11 LAN state and user requested configuration.

It can be seen that a software based wireless infrastructure for 802.11 stations and access points has been described that simplified the hardware needed for the access points and stations. The infrastructure will run on any computing platform that is equipped with a wireless NIC that supports the access point and/or station functionality. The infrastructure allows for dynamic access point or station configuration and provides the ability to form a multi-layer wireless network.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method performed on a computing device that includes at least one processor, memory, and a network interface card ("NIC"), the method comprising:
    implementing, by the computing device, wireless networking functionality of a station or of an access point that are each configured to interact with the NIC; and
    setting, by the computing device, a mode of operation of the NIC that is selected from a group of modes of operation that includes a station only mode, an access point only mode, and a station and access point mode, where the NIC's station only mode supports the wireless networking functionality of the station but not the access point, where the NIC's access point only mode supports the wireless networking functionality of the access point but not the station, where the NIC's station and access point mode supports the wireless networking functionality of the station and the access point, and where the station or the access point, as opposed to the NIC, is configured to provide functionality comprising:
    authentication services;
    wired equivalent privacy ("WEP") functionality;
    packet fragmentation functionality;
    packet defragmentation functionality; or
    association and re-association functionality.

2. The method of claim 1 wherein the WEP functionality comprises:
    a WEP encryption procedure;
    a WEP decryption procedure; or
    security service management functionality.

3. The method of claim 1 wherein the provided functionality further comprises media access control ("MAC") service data unit ("MSDU") support.

4. The method of claim 1 wherein the provided functionality further comprises multiple outstanding MSDU transmission restrictions.

5. The method of claim 1 wherein the association and re-association functionality comprises providing an association state.

6. The method of claim 1 wherein the provided functionality further comprises disassociation functionality or probe functionality.

7. The method of claim 1 wherein the station comprises a station server configured to communicate with a station driver that communicates with the NIC, and where the access point comprises an access point server configured to communicate with an access point driver that communicates with the NIC.

8. At least one computer storage device storing computer-executable instructions that, when executed by a computing device that includes at least one processor, memory, and a network interface card ("NIC"), cause the computing device to:
    implement wireless networking functionality of a station or of an access point that are each configured to interact with the NIC; and
    set a mode of operation of the NIC that is selected from a group of modes of operation that includes a station only mode, an access point only mode, and a station and access point mode, where the NIC's station only mode supports the wireless networking functionality of the station but not the access point, where the NIC's access point only mode supports the wireless networking functionality of the access point but not the station, where the NIC's station and access point mode supports the wireless networking functionality of the station and the access point, and where the station or the access point, as opposed to the NIC, is configured to provide functionality comprising:
    authentication services;
    wired equivalent privacy ("WEP") functionality;
    packet fragmentation functionality;
    packet defragmentation functionality; or
    association and re-association functionality.

9. The at least one computer storage device of claim 8 wherein the WEP functionality comprises:
- a WEP encryption procedure;
- a WEP decryption procedure; or
- security service management functionality.

10. The at least one computer storage device of claim 8 wherein the provided functionality further comprises media access control ("MAC") service data unit ("MSDU") support.

11. The at least one computer storage device of claim 8 wherein the provided functionality further comprises multiple outstanding MSDU transmission restrictions.

12. The at least one computer storage device of claim 8 wherein the association and re-association functionality comprises providing an association state.

13. The at least one computer storage device of claim 8 wherein the provided functionality further comprises disassociation functionality.

14. The at least one computer storage device of claim 8 wherein the provided functionality further comprises probe functionality that comprises probe response or beacon functionality.

15. A computing device comprising:
- at least one processor;
- memory;
- a network interface card ("NIC"); and
- at least one program module, where the computing device is configured, according to the at least one program module, to:
  - implement wireless networking functionality of a station or of an access point that are each configured to interact with the NIC; and
  - set a mode of operation of the NIC that is selected from a group of modes of operation that includes a station only mode, an access point only mode, and a station and access point mode, where the NIC's station only mode supports the wireless networking functionality of the station but not the access point, where the NIC's access point only mode supports the wireless networking functionality of the access point but not the station, where the NIC's station and access point mode supports the wireless networking functionality of the station and the access point, and where the station or the access point, as opposed to the NIC, is configured to provide functionality comprising:
- authentication services;
  - wired equivalent privacy ("WEP") functionality;
  - packet fragmentation functionality;
  - packet defragmentation functionality; or
  - association and re-association functionality.

16. The computing device of claim 15 wherein the WEP functionality comprises:
- a WEP encryption procedure;
- a WEP decryption procedure; or
- security service management functionality.

17. The computing device of claim 15 wherein the station or the access point, as opposed to the NIC, is further configured to provide media access control ("MAC") service data unit ("MSDU") support.

18. The computing device of claim 15 wherein the station or the access point, as opposed to the NIC, is further configured to provide multiple outstanding MSDU transmission restrictions.

19. The computing device of claim 15 wherein the association and re-association functionality comprises providing an association state, or where the providing further comprising disassociation functionality.

20. The computing device of claim 15 wherein the station or the access point, as opposed to the NIC, is further configured to provide probe functionality that comprises probe response or beacon functionality.

* * * * *